(12) United States Patent
Yang et al.

(10) Patent No.: US 12,340,190 B2
(45) Date of Patent: Jun. 24, 2025

(54) TENSOR CHECKPOINT OPTIMIZATION IN DATAFLOW COMPUTING APPLICATIONS

(71) Applicant: SambaNova Systems, Inc., Palo Alto, CA (US)

(72) Inventors: Bowen Yang, Palo Alto, CA (US); Zhuo Chen, Palo Alto, CA (US); Fei Wang, Palo Alto, CA (US); Venkat Krishna Srinivasan, Palo Alto, CA (US); Chen Liu, Palo Alto, CA (US); Junjue Wang, Newark, CA (US); Arvind Krishna Sujeeth, Palo Alto, CA (US); Sumti Jairath, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 145 days.

(21) Appl. No.: 18/129,722

(22) Filed: Mar. 31, 2023

(65) Prior Publication Data
US 2023/0315407 A1    Oct. 5, 2023

Related U.S. Application Data

(60) Provisional application No. 63/331,696, filed on Apr. 15, 2022, provisional application No. 63/331,116,
(Continued)

(51) Int. Cl.
*G06F 8/41*    (2018.01)

(52) U.S. Cl.
CPC ................................. *G06F 8/433* (2013.01)

(58) Field of Classification Search
CPC ...................................................... G06F 8/433
(Continued)

(56) References Cited

U.S. PATENT DOCUMENTS 11,062,202 B2 *   7/2021  James ..................... G06N 3/063
11,182,221 B1 *  11/2021  Sivaramakrishnan .. G06F 30/34
(Continued)

OTHER PUBLICATIONS

Bosilca, George, et al. "The Template Task Graph (TTG)-an emerging practical dataflow programming paradigm for scientific simulation at extreme scale." 2020 IEEE/ACM Fifth International Workshop on Extreme Scale Programming Models and Middleware (ESPM2). IEEE, 2020. pp. 1-7. (Year: 2020).*
(Continued)

*Primary Examiner* — Satish Rampuria
(74) *Attorney, Agent, or Firm* — Flagship Patents; Sikander M. Khan; Bruce A. Young

(57) ABSTRACT

According to a computing method a compiler determines a recompute node included in a dataflow application and a checkpoint tensor produced by the recompute node. The compiler determines a recompute cost to recompute the checkpoint tensor, and a memory cost to checkpoint the checkpoint tensor in a memory. Based on the recompute cost and/or the memory cost, the compiler determines a solution cost and compares the solution cost to a solution threshold. Based on comparing the solution cost to the solution threshold, the compiler determines a checkpoint solution to execute the dataflow application. The checkpoint solution can comprise recomputing or checkpointing the checkpoint tensor. In some implementations, the compiler can determine a recompute ratio of the recompute cost to the memory cost and can compare the recompute ratio to the solution threshold. A computer program product and a computing system can implement aspects of the method.

20 Claims, 8 Drawing Sheets

Related U.S. Application Data filed on Apr. 14, 2022, provisional application No. 63/331,123, filed on Apr. 14, 2022, provisional application No. 63/330,730, filed on Apr. 13, 2022, provisional application No. 63/330,740, filed on Apr. 13, 2022, provisional application No. 63/327,313, filed on Apr. 4, 2022, provisional application No. 63/326,762, filed on Apr. 1, 2022, provisional application No. 63/326,206, filed on Mar. 31, 2022.

(58) Field of Classification Search
USPC .................................................. 717/120–178
See application file for complete search history.

(56) References Cited

U.S. PATENT DOCUMENTS

| | | | | |
|---|---|---|---|---|
| 11,328,208 | B2* | 5/2022 | Lie | G06N 3/084 |
| 11,521,062 | B2* | 12/2022 | Janssen | G06F 18/214 |
| 2019/0228037 | A1* | 7/2019 | Nicol | G06N 3/084 |
| 2019/0279086 | A1* | 9/2019 | Nicol | G06N 3/084 |

OTHER PUBLICATIONS

Kirisame, Marisa, et al. "Dynamic tensor rematerialization." arXiv preprint arXiv:2006.09616 (2020). pp. 1-31. (Year: 2020).*

Chien, Steven WD, et al. "TensorFlow doing HPC." 2019 IEEE International Parallel and Distributed Processing Symposium Workshops (IPDPSW). IEEE, 2019. pp. 509-518. (Year: 2019).*

Liao, Hai-Jun, et al. "Differentiable programming tensor networks." Physical Review X 9.3 (2019): pp. 031041-1 to 031041-12. (Year : 2019).*

Bosilca, George, et al. "The Template Task Graph (TTG)-an emerging practical dataflow programming paradigm for scientific simulation at extreme scale." 2020 IEEE/ACM Fifth International Workshop on Extreme Scale Programming Models and Middleware (ESPM2). IEEE, 2020.pp. 48-54 (Year: 2020).*

Yu, Yuan, et al. "Dynamic control flow in large-scale machine learning." Proceedings of the Thirteenth EuroSys Conference. 2018. pp.1-15 (Year: 2018).*

* cited by examiner

US 12,340,190 B2

TENSOR CHECKPOINT OPTIMIZATION IN DATAFLOW COMPUTING APPLICATIONS

CROSS-REFERENCE AND INCORPORATIONS

This application claims the benefit of U.S. Provisional Patent Application No. 63/326,206 filed Mar. 31, 2022, which is incorporated by reference herein in its entirety.

This application further claims the benefit of U.S. Provisional Patent Application No. 63/326,762 filed Apr. 1, 2022, which is incorporated by reference herein in its entirety.

This application further claims the benefit of U.S. Provisional Patent Application No. 63/327,313 filed Apr. 4, 2022, which is incorporated by reference herein in its entirety.

This application further claims the benefit of U.S. Provisional Patent Application No. 63/330,730 filed Apr. 13, 2022, which is incorporated by reference herein in its entirety.

This application further claims the benefit of U.S. Provisional Patent Application No. 63/330,740 filed Apr. 14, 2022, which is incorporated by reference herein in its entirety.

This application further claims the benefit of U.S. Provisional Patent Application No. 63/331,116 filed Apr. 14, 2022, which is incorporated by reference herein in its entirety.

This application further claims the benefit of U.S. Provisional Patent Application No. 63/331,123 filed Apr. 14, 2022, which is incorporated by reference herein in its entirety.

This application further claims the benefit of U.S. Provisional Patent Application No. 63/331,696 filed Apr. 15, 2022, which is incorporated by reference herein in its entirety.

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language and Compiler for Application Accelerators," *Proceedings of the 39th ACM SIGPLAN Conference on Programming Language Design and Implementation* (PLDI), Proceedings of the 43rd International Symposium on Computer Architecture, 2018.

U.S. patent application Ser. No. 16/822,975, filed Jul. 7, 2020, titled "RUNTIME VIRTUALIZATION OF RECONFIGURABLE DATA FLOW RESOURCES,";

U.S. Nonprovisional patent application Ser. No. 16/239,252, filed Jan. 3, 2019, titled "VIRTUALIZATION OF A RECONFIGURABLE DATA PROCESSOR,"; and, US Nonprovisional patent application titled "SEARCHING CONVOLUTIONAL NETWORK NODES BASED ON NAMED MATRIX DIMENSIONS,"by Wang, et al.

FIELD OF THE TECHNOLOGY

The present disclosure relates to compilers for data parallel and dataflow applications and determining allocation of computing system hardware resources to execute such applications. The applications can include machine learning, Artificial Intelligence, and convolutional neural networks. In particular the present disclosure relates to compilers for dataflow and neural network computing applications.

BACKGROUND

The present disclosure relates to compilers for data parallel and dataflow applications. Such compilers can include determining allocation of computing system hardware resources to execute such applications. The applications can include machine learning, Artificial Intelligence, and convolutional neural networks. The present disclosure relates more particularly to recomputing and checkpointing tensor data in neural networks.

BRIEF DESCRIPTION OF THE DRAWINGS

The drawings included in the present disclosure are incorporated into, and form part of, the specification. They illustrate implementations of the present disclosure (hereinafter, "the disclosure) and, along with the description, serve to explain the principles of the disclosure. The drawings are intended to be only illustrative of certain implementations and are not intended to limit the disclosure.

Figure 1:
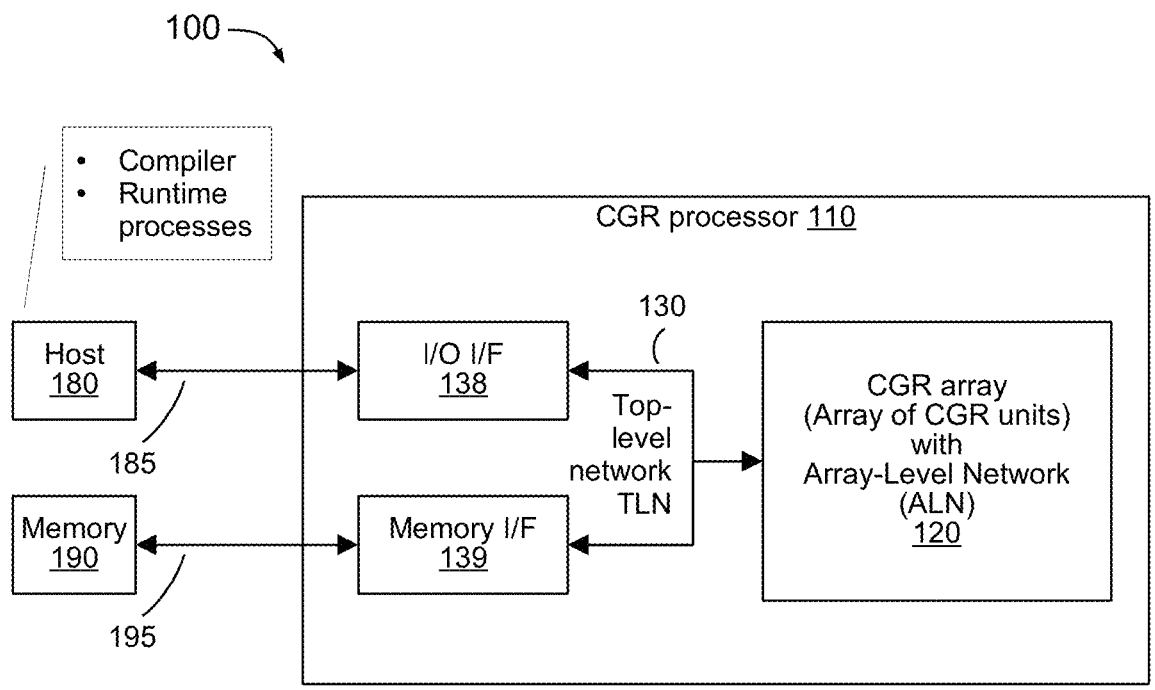
FIG. 1 illustrates an example coarse-grain reconfigurable (CGR) system (CGRS), according to aspects of the disclosure.

In the figures, like reference numbers can indicate functionally similar elements. The systems and methods illustrated in the figures, and described in the Detailed Description below, can be arranged and designed in a wide variety of different implementations. Neither the figures nor the Detailed Description are intended to limit the scope of the claims. Instead, they merely represent examples of different implementations of the disclosed technology.

SUMMARY

A method of a compiler for a dataflow application comprises the compiler determining a recompute node included in the application and determining a checkpoint tensor produced by the recompute node. In the method the compiler determines a recompute cost to recompute the checkpoint tensor, and a memory cost to checkpoint the checkpoint tensor in a memory, during execution of the dataflow application.

Based on the recompute cost and/or the memory cost, the compiler determines a solution cost and compares the solution cost to a solution threshold. Based on comparing the solution cost to the solution threshold, the compiler determines a checkpoint solution to execute the dataflow application. The checkpoint solution can comprise recomputing or checkpointing the checkpoint tensor. In some implementations, the compiler can determine a recompute ratio of the recompute cost to the memory cost and can compare the recompute ratio to the solution threshold.

A computer program product and a computing system can implement aspects of the method.

DETAILED DESCRIPTION

Aspects of the present disclosure (hereinafter, "the disclosure") relate to methods of compiling neural network applications for execution on computing systems utilizing reconfigurable dataflow processing elements, in particular utilizing coarse-grain reconfigurable processors (CGRPs). More particular aspects relate to an application compiler determining candidate nodes of an application graph, corresponding to a dataflow or data parallel application, for recomputing tensor output versus persisting the tensor output in a memory (checkpointing) for later use by nodes of the application. Implementations of the disclosure (hereinafter, "implementations") can analyze an application graph of to determine to recompute or checkpoint tensor data and can include recompute or checkpoint decisions ("checkpoint solutions") in mapping decisions to map neural network operators and data flow to CGRP processing and/or memory elements, and/or configurations of CGRP processing and/or memory elements.

Processing elements that implement aspects of the disclosure can include processors of data parallel (DP) and/or dataflow computing systems, such as Central Processing Unit (CPUs), Graphics Processing Units (GPUs), Field Programmable Gate Arrays (FPGAs), and Digital Signal Processors (DSPs). Certain aspects of the disclosure relate to executing neural networks on computing systems utilizing reconfigurable processor architectures, such as CGRPs, reconfigurable Application Specific Integrated Circuits (ASICs), and/or Application Specific Instruction-set Processors (ASIP).

Implementations that are not mutually exclusive are taught to be combinable. One or more features of an implementation can be combined with other implementations. The disclosure in some instances repeats references to these options. However, omission from some implementations of recitations that repeat these options should not be taken as limiting the combinations taught in the preceding sections—these recitations are hereby incorporated forward by reference into each of the following implementations.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and/or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein.

The terms "comprising", "including", and "having" can be used interchangeably herein.

Unless otherwise specified, the use of ordinal adjectives first, second, third, etc., to describe an object, merely refers to different instances or classes of the object and does not imply any ranking or sequence.

As used herein, "incorporated subject matter" refers, collectively, to subject matter disclosed, and/or otherwise encompassed, among the disclosures incorporated herein by reference. For purposes of illustrating the disclosure, but not intended to limit implementations, various terms of the disclosure are drawn from the incorporated subject matter. As used herein, unless expressly stated otherwise, such terms as can be found in the incorporated subject matter have the same meanings, herein, as their meanings in their respective incorporated disclosures.

Aspects of the disclosure can be appreciated through a discussion of example implementations and/or applications of methods and/or systems. However, such examples are for purposes of illustrating the disclosure. It should be understood that the intention is not to limit the disclosure to the example implementations described herein, but to encompass all modifications, equivalents, and alternatives falling within the spirit and scope of the disclosure. Thus, the disclosure is not intended to be limited to the implementations shown but is to be accorded the widest scope consistent with the principles and features disclosed herein. Various modifications to the disclosed examples will be readily appreciated by those of ordinary skill in the art, and the general principles defined herein can be applied to other implementations of the disclosure without departing from the spirit and scope of the disclosure.

The disclosure uses terms and acronyms related to the field of the technology, defined, at least in part, herein as:

AI—artificial intelligence.

AIR—arithmetic or algebraic intermediate representation.

ALN—array-level network.

Application Model—In machine learning applications, "application model" commonly refers to a mathematical representation of a machine learning application. An application model can comprise an application graph and/or textual (e.g., high level, intermediate level, and/or low level programming language) representation. An application model can represent a set of mathematical operators (compute functions of an application) and a flow of data between the operators, and can represent the operators and dataflow graphically and/or textually. As used herein, "application model" or, simply, "model" refers interchangeably to an application itself (e.g., high level programming statements of an application) and a graphical and/or textual representation of the application's compute functions and/or dataflow.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

CGR unit—a circuit that can be configured and reconfigured to locally store data (e.g., a memory unit or a partition memory unit, such as described in Prabhakar), or to execute a programmable function (e.g., a processor or other compute unit, or a partition compute unit such as described in Prabhakar). A CGR unit includes hardwired functionality that performs a limited number of functions used in computation graphs and dataflow graphs. Some implementations include switches to route data among CGR units.

CGR Array—an array of CGR units, coupled with each other through an array-level network (ALN), and coupled with external elements via a top-level network (TLN). In implementations a CGR array can physically implement the nodes and edges of a computation and/or dataflow graph.

CGRP—Coarse-grain reconfigurable processor. As used herein, CGRP refers to a processor, or processing element, based on a CGRA—such as an integrated circuit, chip, or module based on, or incorporating, a CGRA—and/or incorporates a CGR unit, CGR array, or elements of a CGR unit and/or a CGR array.

CGR Components—As used herein, "CGR components" refers, collectively, to hardware resources or elements of CGR units, CGR arrays, and CGRP; memories of CGR units/arrays/processors; and, networks and/or I/O interconnections and interface hardware interconnecting CGR units/arrays/processors and/or memories, such as Ethernet networks/interfaces, I/O buses/interfaces, such as PCI-Express buses, InfiniBand buses/interfaces, and/or memory or data buses/interfaces, such as buses of a processor and/or memory fabric, and related interface hardware).

CGR hardware—As used herein, the terms "CGR hardware" and "CGR hardware resources" refer to any individual hardware element, or combination of hardware elements, of CGR components of a CGRS.

CGRS—a computing system comprising CGR units and/or CGRPs. As used herein, CGRS refers to a computing system that is based on, and/or can utilize, reconfigurable computing resources, such as CGR arrays, CGR units, and/or CGRPs, to perform operations of data parallel and/or dataflow applications. U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, illustrate example implementations of CGR arrays, CGR units, CGRPs, and CGR systems.

Chip—As used herein, the term "chip" refers to an IC (or, combination of ICs) that can embody elements of a CGRA. A chip can typically be packaged in a chip module (e.g., a single chip module, "SCM" or, alternatively, a multi-chip module, "MCM").

Compiler—a translator that processes statements written in a programming language to machine language instructions for a computer processor. A compiler can include multiple stages to operate in multiple steps. Each stage can create or update an intermediate representation (IR) of the translated statements. Compiler stages are illustrated with reference to FIG. 3.

Computation graph/Graph—As used herein, computation graph refers to a type of directed graph comprising nodes and edges connecting the nodes, to represent a dataflow application. In a neural network application nodes can represent mathematical operations/expressions and edges that indicate dependencies between the operations/expressions. For example, in machine learning (ML) algorithms, input layer nodes can assign variables, output layer nodes can represent algorithm outcomes, and hidden layer nodes can perform operations on the variables. Edges can represent data (e.g., scalars, vectors, tensors) flowing between operations. In addition to dependencies, the computation graph reveals which operations and/or expressions can be executed concurrently.

Dataflow Application—As used herein, the term "dataflow" application refers interchangeably to data parallel and dataflow applications. such as ML, AI, and other massively parallel computing applications.

Dataflow Graph—a computation graph, or portion of a computation graph, corresponding to operators (application compute functions), data, and flow of data among operators, of a dataflow application that includes one or more loops of operator nodes that can be nested, and wherein nodes can send messages to nodes in earlier (predecessor) layers to control the dataflow between the layers.

IC—integrated circuit—a monolithically integrated circuit, i.e., a single semiconductor die which can be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Intermediate Representation (IR)—an Intermediate Representation is a representation of an application in an intermediate langue. An IR can incorporate partial compilation results, such as sections (groupings) of a graph or model, pipelines that can be formed within a graph or model, mappings of application functions or graph nodes/edges to hardware resources of a CGRS.

Logical CGR—A logical CGR array or logical CGR unit comprises a representation of a CGR array or a CGR unit that is physically realizable, but that may not, at a particular time in executing a dataflow application, have been assigned to a physical CGR array or to a physical CGR unit on an IC.

ML—machine learning.

PEF—processor-executable format—a file format suitable for configuring a configurable data processor.

Pipeline—a staggered flow of computational operations through a chain of pipeline stages in which the operations can be executed in parallel. In an application graph, a pipeline can comprise a set of operator nodes that can pipeline operations of the graph.

Pipeline Stages—a pipeline can be divided into stages that are coupled with one another as predecessor/successor stage to form a pipe topology.

PNR—place and route—the assignment of logical CGR units and associated processing/operations to physical CGR units in an array, and the configuration of communication paths between the physical CGR units.

RAIL—reconfigurable unit abstract intermediate language.

RP—reconfigurable processor. An RP can comprise, for example, field programmable gate arrays (FPGAs), graphic processing units (GPUs), and/or CGRPs.

TLIR—template library intermediate representation (IR).

TLN—top-level network.

Turning now to more particular aspects of the disclosure, high-level programs for machine learning (ML) and artificial intelligence (AI) can require massively parallel computations, where many parallel and interdependent computation threads (pipelines) exchange data. Such programs are ill-suited for execution on traditional, Von Neumann architecture computers. Rather, these applications can require architectures optimized for parallel and pipeline processing, such as CGRAs or graphic processing units (GPUs).

The ascent of dataflow applications such as ML and AI, and massively parallel architectures (such as CGRAs) places new and complex requirements to execute the applications, or computations of the applications, on CGR hardware. Such requirements can include how computations of an application are pipelined, which computations are assigned to which compute units, how data is routed between various compute units and memories, and how synchronization among processors, memories, and data transfer hardware is controlled, particularly when a dataflow applications includes one or more nested loops, whose execution time can varies depending on the data being processed. The architecture, configurability and dataflow capabilities of CGR systems, and CGR components of CGR systems, enable increased compute power that supports both parallel and pipelined computation.

In implementations CGR components of a CGRS, for example, can be programmed to simultaneously execute multiple independent and interdependent operations. To enable simultaneous execution within a pipeline stage, and across pipeline stages, dataflow applications need to be distilled from a high-level program and translated to low level instructions to execute the program on hardware resources of reconfigurable dataflow systems, such as a CGRS. The low level instructions can comprise a configuration file describing a configuration of CGR components, as well as processor (e.g., CGRP) instructions and/or instructions for transferring application data among CGR components.

A high-level program is source code written in programming languages like Spatial, Python, C++, and C, and can use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

In computing applications, a compiler translates high-level programs to instruction executable by processors of a computing system. In a CGRS, a CGRS compiler can translate high-level programs to processor instructions, but also to executable instruction files and/or "bit files" describing configurations of CGR components to execute a dataflow application, or pipeline stages of a dataflow application. CGRS compilers require mapping application operations and data flow to CGR hardware components in both space (CGR hardware parallelism) and time (for synchronization of interdependent computations). This requirement implies that a CGRS compiler must determine which operations of a dataflow application are assigned to which of the CGR components, and how both data and, related to the support of computation and control information flow among CGR components, and to/from external hosts and storage. This process, known as "place and route", is one of many new challenges posed to CGRS compilers.

FIG. 1 illustrates an example reconfigurable dataflow computing system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via data bus 130 which can be part of a top-level network (TLN). Host 180 communicates with IO interface 138 via system data bus 185, and memory interface 139 communicates with memory 190 via memory bus 195. Array of CGR units 120 can further include compute units and memory units that connected with an array-level network (ALN) to provide the circuitry for execution of a computation graph or a dataflow graph that can have been derived from a high-level program with user algorithms and functions. The high-level program can include a set of procedures, such as learning or inferencing in an AI or ML system. More specifically, the high-level program can include applications, graphs, application graphs, user applications, computation graphs, control flow graphs, dataflow graphs, models, deep learning applications, deep learning neural networks, programs, program images, jobs, tasks and/or any other procedures and functions that can need serial and/or parallel processing. In some implementations, execution of the graph(s) can involve using multiple units of CGR processor 110. In some implementations, CGR processor 110 can include one or more ICs. In other implementations, a single IC can span multiple CGR processors. In further implementations, CGR processor 110 can include one or more units of array of CGR units 120.

Host 180 can be, or can include, a computer such as will be further described with reference to the examples of Grohoski and Kumar. Host 180 can execute runtime processes, as further referenced herein, and can also be used to run computer programs, such as a CGRS compiler. In some implementations, the compiler can run on a computer that is similar to the computer described in the examples of Grohoski and Kumar, but separate from host 180.

CGR processor 110 can accomplish computational tasks by executing a configuration file (for example, a PEF file). For the purposes of this description, a configuration file corresponds to a dataflow graph, or a translation of a dataflow graph, and can further include initialization data. A compiler compiles the high-level program to provide the configuration file. In some implementations described herein, a CGR array is configured by programming one or more configuration stores with all or parts of the configuration file. A single configuration store can be at the level of the CGR processor or the CGR array, or a CGR unit can include an individual configuration store. The configuration file can include configuration data for the CGR array and CGR units in the CGR array, and link the computation graph to the CGR array. Execution of the configuration file by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that can comprise multiple IC dies and other devices, assembled into a single module as if it were a single device. The various dies of an MCM can be mounted on a substrate, and the bare dies of the substrate are electrically coupled to the surface or to each other using for some examples, wire bonding, tape bonding or flip-chip bonding.

Many dataflow applications, such as in ML and other types of AI applications, comprise neural networks (NNs). Examples of neural networks include fully connected neural networks (FCNNs), recurrent neural networks (RNNs), graph neural networks (GNNs), convolutional neural networks (CVNNs), graph convolutional networks (GCNs), long short-term memory (LSTM) networks, autoencoders, deep belief networks, and generative adversarial networks (GANs).

In data parallel and dataflow applications, such as NNs, compute functions of the application are often referred to as "operators". The compute functions perform computations, such as matrix computations using tensor data of the application, to execute the higher level processes of the application (e.g., object recognition in an image, natural language phrase interpretations or prediction, etc.). A neural network processes data according to a flow of computational input (operand) and computational output (results) data through layers of operators (neurons) of the NN.

Operators of an input layer can receive stimuli (e.g., input data), and the input and other (e.g., "hidden") layers compute particular functions (e.g., an activation or loss function), and operators of an output layer output computational results. A particular layer of an NN comprises operators that perform the particular function computations of that layer. Example layers, and associated operators, of NNs include rectified linear unit (ReLU) layers, fully connected layers, recurrent layers, graphical network layers, long short-term memory layers, convolutional layers, kernel layers, dropout layers, and pooling layers.

A machine learning application requires "training" within a problem space the application is designed to recognize (e.g., subjects of images, audio, or video) or predict outcomes (e.g., natural language phrase completion, future values, etc.). Training a neural network can comprise determining and/or optimizing parameters associated with computations (e.g., activation functions) of the NN computed by operators within layers of the NN. Weights and biases, for example, can be parameters of a weights-bias activation function of a neural network. In training such an NN, a training (data parallel/dataflow) application can compute gradients of weights and biases, such as by using a loss-function, and can optimize the weights and biases based on an optimization algorithm such as gradient descent. Executing an ML application can utilize the optimized parameters to execute functions of the application.

Problem spaces of a machine learning application, and/or input of dataflow applications in general, can comprise enormous amounts of data, and can often comprise tensor data. Thus, functions of these applications (e.g., operators of neural networks) commonly involve linear algebra computations over tensor data, such as matrix multiplication, transposition, and addition. Algorithms commonly employed in dataflow applications include algorithms such as linear regression and gradient descent over tensors and/or matrices of tensors. Matrices of tensors data can comprise matrices of varying dimensions and a variety of computing systems, including dataflow computing systems, can perform matrix computations, such as GeMM, matrix summation, matrix transposition, gradient computations, and/or backpropagation of matrix computations, to process tensors in dataflow applications such as machine learning in neural networks.

As used herein, brackets and a capital letter, such as [M], is used to refer to a matrix as a whole, while lowercase letters, such as m, are used to refer to an element, or set of elements, of a matrix [M]. For example, an expression such as (w×a) refers, herein, to a multiplication of a set of elements of matrices [W] and [A], such as elements of a row of matrix [W] multiplied by elements of a corresponding column of matrix [A]. The term "element", in reference herein to a matrix, refers to the contents (e.g., a scalar value) of a row and column cell of the matrix.

A common computation for processing tensors in dataflow applications is a sum of products (dot product) of two matrices. The products comprise products of elements of a row of one multiplicand matrix (a "left side" matrix_multiplied by corresponding elements of a column of a second multiplicand (a "right side" matrix), where the row dimension of the left side matrix and the column dimension of the right side are the same (shared dimension.) As used herein, the term "dot product" refers to a sum of two or more products of a row of a left side matrix multiplicand by a column of a right side matrix. An expression such as ($\Sigma$w a) refers to a sum-product of elements w and a (e.g., a sum of products w×a for elements of a row of a matrix [W] multiplied by elements of a column of a matrix [A]). As an example, a dot product of elements $w_{11}$ of matrix [W multiplied by au of matrix [A], and $w_{11}$ multiplied by $a_{21}$ of matrix [A], is $[w_{11} \times a_{11} + w_{11} \times a_{21}]$.

A "matrix summation" computation, as used herein, refers to a matrix computation in which a dot product of two multiplicand matrices is added to a matrix addend. A matrix addend can comprise a constant or can comprise a matrix (which can itself be multiplied by a matrix multiplied by a constant) sharing a row dimension of the dot product of two multiplicand matrices. A "weight-bias function", $y=\Sigma w\ a+b$, is one example of such a computation, in which a weights matrix [W] is multiplied by an activation matrix [A] and the dot products, $\Sigma w\ a$, for each row/column set of products, is added to elements of a bias matrix [B].

In implementations, a CGRP, and/or other CGR components of a CGRS, can perform computations (e.g., operators) of applications in a distributed fashion and/or can execute computations as dataflow pipelines that can efficiently exploit CGRS and application parallelism, and CGR component data locality. Dataflow pipelines of CGRS compute units (e.g., CGRPs and/or CGR arrays) can contain several computational stages, in which each stage can read data from one or more input buffers (e.g., buffers in CGR component memories), can perform computations on the data while using one or more internal buffers to store and retrieve intermediate results, can produce outputs, and can write the outputs to one or more output buffers.

Data parallel and dataflow computing applications can comprise tensor computations, usually involving enormous amounts of data, such as very large and/or numerous matrices of tensor data. For example, machine learning (ML) and other tensor-based applications can comprise a convolutional neural network (NN). While not intended to limit implementations, a convolutional neural network can serve to illustrate aspects of the disclosure. However, it will be appreciated by one of ordinary skill in the art that aspects of the disclosure can apply broadly to a variety of computing applications involving tensor data, and/or executed by data parallel and/or dataflow applications and computing systems.

An NN can comprise layers organized as a pipeline of computations using matrices of tensor data. A layer of the NN can comprise operators performing computations on matrices of tensor data. A particular operator of an NN (or, tensor-based application in general) can perform a matrix computation, such as Generalized Matrix Multiplication ("GeMM"), matrix convolution, and Rectified Linear Units ("ReLU") corresponding to particular algorithms and/or functions of the application, such as an activation function, gradient descent function, and/or a loss function. A particular layer of an NN can comprise multiple processing elements, such as CGRPs, executing in parallel to perform operator computations of the application using subsets of tensor data. The processing elements of one layer of an NN can output results of their computations to a successor "forward" and/or "backward" layer of the NN.

Various types and/or combinations of computing systems can execute tensor-based applications, and/or operators of tensor-based applications, such as NNs. Data parallel (DP) and dataflow computing systems, particularly systems utilizing CGRPs, can be particularly efficient at executing tensor-based applications. CGRPs can individually, or in combination, execute functions and/or computations of application operators, in parallel and in pipelines, to efficiently execute an application and improve performance of application execution. As used herein, the term "reconfigurable dataflow system (DS)" refers, interchangeably, to data parallel and dataflow computing systems utilizing reconfigurable processors such as CGRPs. An RDS can, for example, efficiently execute tensor-based applications such as convolutional neural networks, and can serve to illustrate aspects of the disclosure without limiting implementations.

A tensor-based application can include "operators" that perform computations such as linear regression, non-linear regression, Gaussian regression, Support Vector Machine (SVM) regression, Generalized Linear Models, regression trees, shallow and deep neural network models, logistic regression, decision tree, and, "K" nearest neighbor, using matrices of tensor data. One expression, or representation, of an application is a computation graph (hereinafter, for brevity, simply "graph"), which can be textual, graphical, or a combination of textual and graphical descriptions of operators, operands, and results of computations of the application. A graph can represent the operators (as compute nodes of the graph) of an application, and their arrangement and/or dependencies (e.g., flow of computational inputs and outputs) among the operators (as edges of the graph).

Data nodes of a graph can represent particular application data elements, such as input data for training an ML model. A graph can be a directed acyclic graph (DAG), or can comprise loops, and even nested loops, of operators. As used herein, except where otherwise qualified as "data node", the term "node" is used herein interchangeably to refer to an operator of an application and a node representation of that operator in a graph.

Forward nodes of a graph can receive outputs of backward nodes (e.g., gradients), and backward nodes can receive updated outputs of forward nodes (e.g., outputs computed using outputs of backward nodes), creating feedback loops within the graph. As nodes within a feedback loop recompute outputs based on the feedback, such nodes are referred to herein as "recompute nodes".

A pipeline of an application can comprise a set of forward operators and, optionally, set of backward operators (e.g., backpropagation operators). Each operator within a pipeline can process data output from a predecessor operator, generally in parallel with the predecessor operators as the predecessor operator outputs results of computations over a portion input data.

Figure 2:
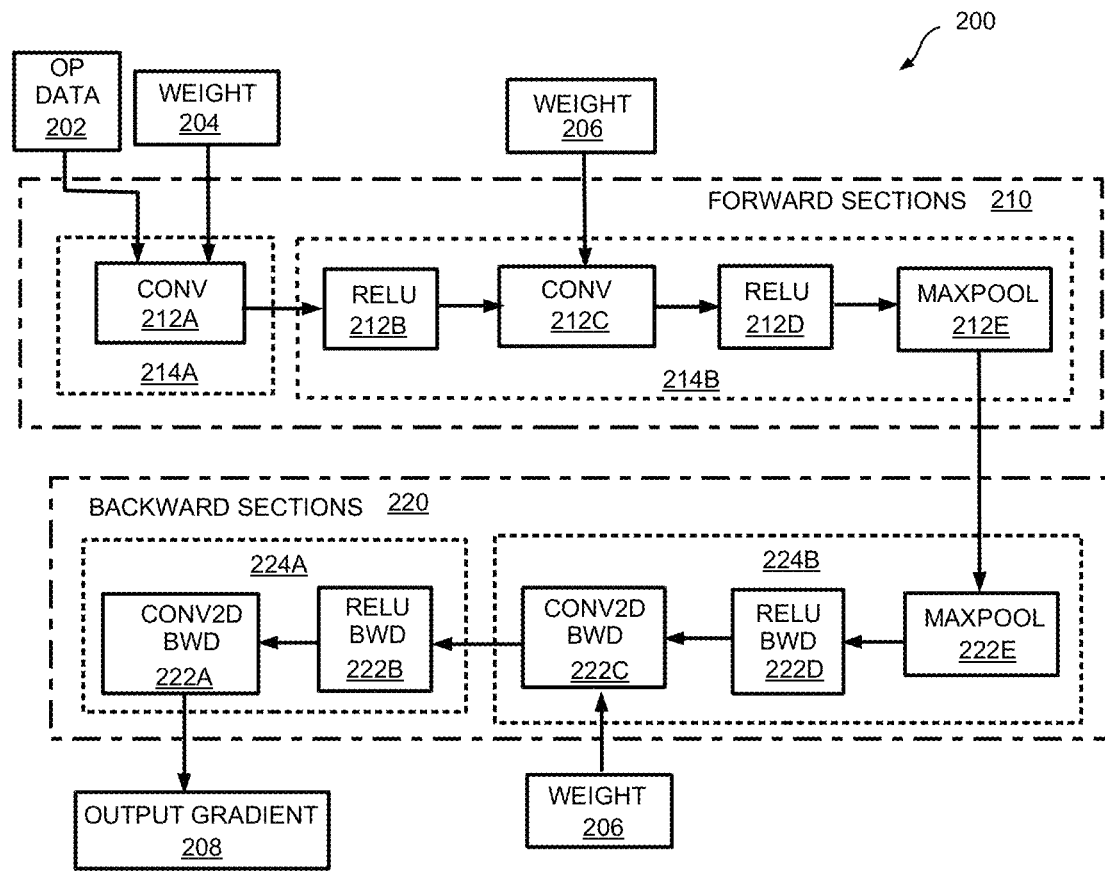
FIG. 2 illustrates an example sub-graph of an application model graph, according to aspects of the disclosure.

FIG. 2 illustrates an example of a computation graph corresponding to an application. As shown in FIG. 2, forward and backward operators of an application can be grouped, such as for mapping the operators to CGR components for execution, as respective forward and backward sections of a graph. The sections can each represent nodes of the graph that do not have data dependencies among each other (that is, do not need to await complete computational results of another compute node), such that a CGRS can execute computations of the nodes in a pipeline topology among CGR components. Sections can particularly comprise operators that are logically adjacent in a graph and, based on not having data dependencies among each other, can form a pipeline. A "producer" operator and a "consumer" operator are adjacent operators in a graph if the producer can input results of the producer operator computations to an operand of the consumer operator. For example, a GeMM operator is adjacent to an ADD operator if a results matrix (or elements of a results matrix) of the GeMM operator can be direct input to the ADD operator.

In FIG. 2, forward sections 210 is shown comprising Pipe 214A and Pipe 214B, and backward sections 220 is shown comprising Pipe 224A and Pipe 224B. Pipe 214A is shown comprising node CONV 212A, and Pipe 224B is shown comprising nodes RELU 212B, CONV 212C, RELU 212D, and MAXPOOL 212E (hereinafter, collectively "nodes 212). Names of nodes, such a "RELU", can indicate a type of computation of the application performed by a node.

Edges of a graph can represent data flow between and into or out of the nodes. Thus, computational results of node CONV 212A can flow as inputs to node RELU 212B, computational results of node RELU 212B can flow as inputs to node CONV 212C, and so forth. Data nodes in a graph can represent data processed by compute nodes and flow of data into or out of the nodes (as also shown in FIG. 2 by directed arrows). In forward sections 210, FIG. 2 depicts data nodes OP DATA 202 and WEIGHT 204 as data input to CONV 212A, and WEIGHT 206 as data input to CONV 212C.

In FIG. 2, backward sections 220 is shown comprising Pipe 2224A and Pipe 224B, Pipe 224A is shown comprising nodes CONV2D BWD 222A and RELU BWD 222B, and Pipe 224A is shown comprising nodes CONV2D BWD 222C, RELU BWD 222D, and MAXPOOL 222E. In backward sections 220, FIG. 2 depicts data node WEIGHT 206 as data input also to CONV2D BWD 222C. Backward nodes of a graph can represent nodes that receive outputs of forward nodes and compute a feedback function over those outputs. For example, a common backward computation is to compute gradients of weights and biases, and/or loss functions based on gradients of weights and biases, in a weights-bias activation function of a forward node. Backward nodes, can compute, for example, a gradient in an application that include gradient descent to optimize computations of forward nodes in a feedback loop. As shown, an output of backward sections 220 is data node output gradient 208, output node CONV2D BWD 222A.

In implementations, a "CGRS compiler" can compile a high-level language representing of a data parallel and/or dataflow application to configurations and/or execution instructions to execute the application. For brevity, hereinafter "application" is understood to refer to a data parallel or dataflow programming application for execution by a data parallel and/or dataflow computing system, such as a CGRS.

A CGRS compiler can, for example, transform an application into, and/or can utilize, a graph such as example graph 200 in FIG. 2. Based on a graph of an application, a CGRS compiler can generate a search space, and can use the graph and/or search space to determine model operational parallelism and pipelining, and/or to map model dataflow (e.g., nodes and edges of a computation graph) to CGRS and/or CGR hardware resources and dataflow through the resources. A compiler can further transform resource mapping decisions into assembler input for generation of hardware instructions and/or hardware configuration files, such as a Processor Executable Format (PEF) file.

Figure 3:
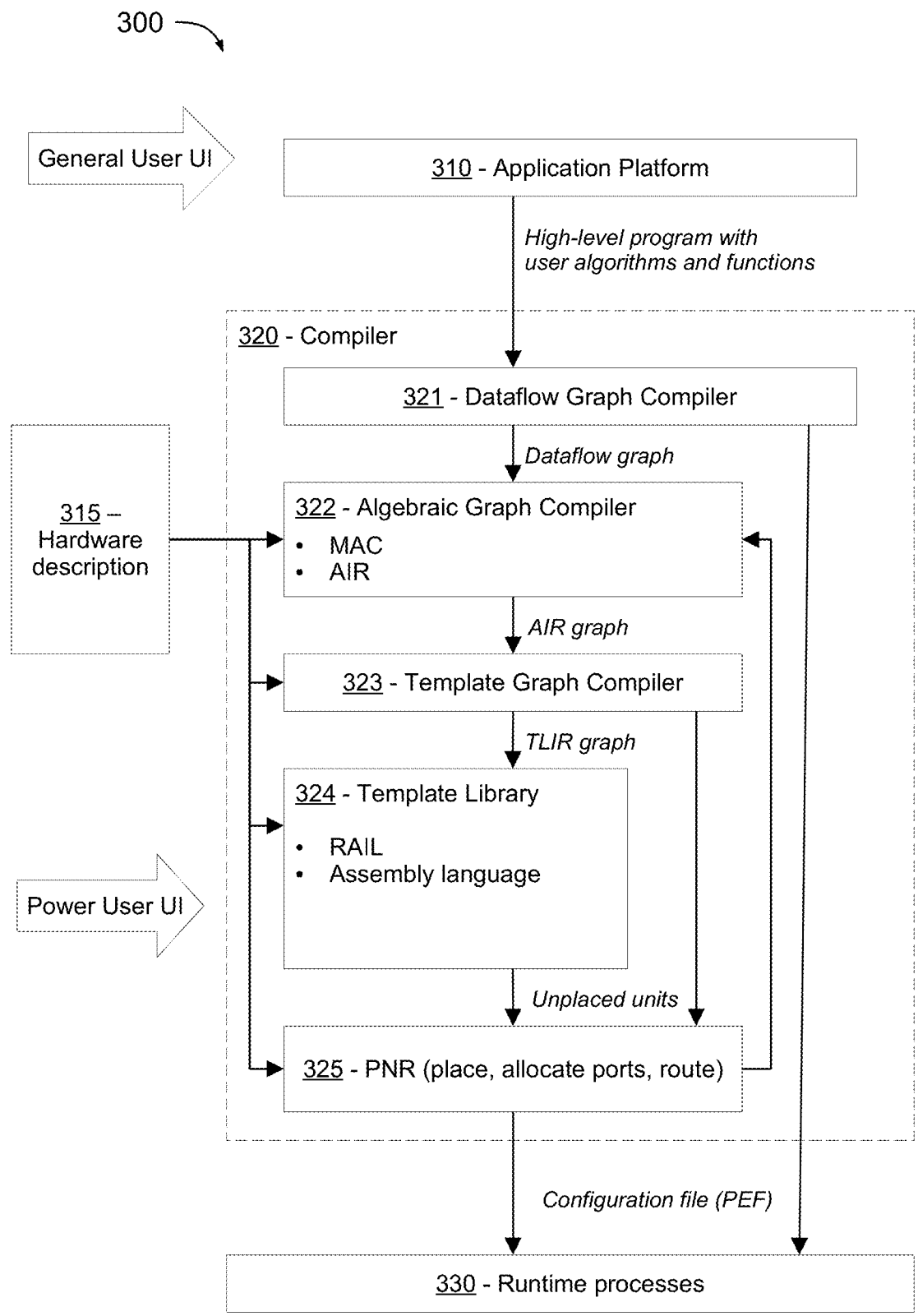
FIG. 3 illustrates an example compiler stack, according to aspects of the disclosure.

FIG. 3 is a block diagram of example compiler stack 300 comprising multiple compilation stages to compile a dataflow application for execution by a CGRS. As depicted in FIG. 3, compiler stack 300 includes several stages to translate a high-level program, with (user) dataflow application algorithms and functions (e.g., ML algorithms and/or tensor computation functions), to configuration and/or instruction data for a CGRS to execute the application.

Compiler stack 300 can take its input from application platform 310, and/or any other source of high-level program statements of an application, which provides a user interface, such as an API and/or command line interface (CLI), for application developers to compile an application. A "user", as used herein, can be any human or computing system that develops an application (e.g., programs the high-level programs of an application), and/or that can input an application into a CGRS compiler for translation to CGRS configurations and/or CGRS execution instructions.

Compiler stack 300 can further receive hardware description 315, which can comprise a textual and/or graphical description of CGRS and/or CGR hardware components of a CGRS. Compiler stack 300 can utilize hardware description 315 to translate the high-level programming statements of an application to configurations CGR components and/or execution instructions (e.g., instructions to a runtime processor to control execution, and/or processor instructions to execute functions, of an application) to execute the application.

Application platform 310 can comprise a computing system for developing an application and/or inputting an application for compilation by a CGRS compiler. For example, application platform 310 can comprise a computing system capable of hosting a user, such as host processor in the CGRS examples of Kumar. Application platform 310 can include libraries such as PyTorch, TensorFlow, ONNX, Caffe, and Keras to provide user-selected and configured algorithms.

Application platform 310 can output a high-level program of an application to compiler 320, which in turn can output a configuration file to runtime processes 330. Runtime processes 330 can comprise programs to configure CGR components, and/or manage execution of an application on CGR components, of a CGRS. The programs can execute on a runtime processor (e.g., one or more CPUs) of a CGRS.

Compiler 320 can include dataflow graph compiler 321, algebraic graph compiler 322, template graph compiler 323, template library 324, and placer and router PNR 325. In implementations, template library 324 can include a reconfigurable unit abstract intermediate language (RAIL), and/or assembly language interfaces (APIs) for power users.

Dataflow graph compiler 321 can analyze high-level programs, implementing user algorithms and application functions received from application platform 310, and can convert the high-level programs to one or more dataflow graphs. The high-level programs can be suitable for parallel and/or pipeline processing and nodes of the dataflow graphs can be intrinsically parallel unless an edge in the graph indicates a dependency. Dataflow graph compiler 321 can provide code optimization steps, such as false data dependency elimination, dead-code elimination, and numeric constant folding. The dataflow graphs can encode data and execution control dependencies of the high-level programs.

Dataflow graph compiler 321 can support programming a CGR components (e.g., CGRPs) using higher or lower-level programming languages, For example dataflow graph compiler 321 can support translation or conversion from an application platform 310 to C++ and/or an assembly language. In implementations, dataflow graph compiler 321 can allow programmers to provide code (e.g., machine language code) that runs directly on CGRPs and/or other CGR components. Dataflow graph compiler 321 can include one or more programming libraries, and the libraries can include predefined functions, such as linear algebra operations, element-wise tensor operations, non-linear functions, and reduction functions for creating, executing, and profiling dataflow graphs on the CGRPs. Via the application platform 310, dataflow graph compiler 321 can provide an API to enhance programming functionality available to application developers.

Algebraic graph compiler 322 can include a Model Analyzer and Compiler (MAC) level that can make high-level mapping decisions for sub-graphs (also referred to as "sections" or "section cuts") of a dataflow graph based on CGR hardware constraints. Algebraic graph compiler 322 can support various application frontends, such as Samba, JAX, and TensorFlow/HLO. Algebraic graph compiler 322 can also transform the graphs, for example via autodiff and GradNorm, to perform stitching between sub-graphs, interface with template generators for performance and latency estimation, convert dataflow graph operations to algebraic intermediate representation (AIR) operations, perform tiling, sharding (database partitioning) and other application preparation operations, and can model or estimate execution parallelism that can be achieved within the dataflow graphs.

Algebraic graph compiler 322 can include an arithmetic or algebraic intermediate representation (AIR) level that can translates high-level dataflow graph and mapping decisions provided by a MAC level into AIR graphs. An AIR level can include validating and/or correcting ("legalizing") a dataflow graph and/or mapping decisions of a MAC; expanding data parallel, tiling, pipeline, and/or region instructions provided by a MAC; inserting stage buffers and skip buffers, eliminating redundant operations, buffers, and sections; and, optimizing resource use, execution latencies, and computational throughput.

Template graph compiler 323 can translate AIR graphs to a template library intermediate representation (TLIR). A TLIR can comprise a graph that can optimize configurations and/or execution instructions based on target (CGRS and/or CGR) hardware architecture and/or to unplaced units suitable for place, allocate, and route level PNR 325. Template graph compiler 323 can add further information node names, node inputs, node input names, and dataflow descriptions) as inputs to PNR 325, and can make the graph physically realizable through each layer of the graph. Template graph compiler 323 can, for example, translate AIR graphs to specific application operation templates, such as templates for general matrix multiplication (GeMM), matrix transposition, and/or matrix convolution operations. In implementations a CGRS compiler like compiler 320 a can convert part or all intermediate representation operations to templates, stitch templates into data and control flow of the application, insert necessary buffers and layout transforms, generate test data, and optimize for CGR hardware utilization, execution latency, and compute and/or data transfer throughput.

Implementations can use templates for common operations. Templates can be implemented using assembly language, RAIL, or similar language and/or representation constructs. RAIL can compare to a low-level language, in that memory units and compute units can be separately programmed in RAIL constructs, but RAIL can provide a higher level of abstraction and compiler intelligence that, for example, an assembly language, via a concise performance-oriented and domain-specific language for CGR component (e.g., CGR array) templates. RAIL can enable template writers and external power users to control interactions between logical compute units and memory units of CGR components using high-level expressions, without the need to manually program actions such as capacity splitting, register allocation, etc. RAIL logical compute and memory units can also enable stage/register allocation, context splitting, transpose slotting, resource virtualization and mapping to multiple physical compute units and memory units (e.g., PCUs and PMUs of tiles, such as in the examples of Grohoski and Kumar).

Template library 324 can include an assembler that provides an architecture-independent, low-level programming interface as well as optimization and code generation for CGR hardware. An assembler can include memory address expression compilation, CGR hardware intra-unit resource allocation and management, rendering a template graph physically realizable based on CGR hardware-specific rules, low-level CGR hardware architecture-specific transformations and optimizations, and CGR hardware architecture-specific code generation.

PNR 325 can translate RAIL and/or assembly language outputs of template library 324, and/or TLIR outputs from template graph compiler 323, and can map logical (e.g., unplaced physically realizable) CGR units, to physical CGR hardware implementation levels, such as an SCM, MCM, and/or chip level of CGR components, can determines physical data channels to allow for communication among the CGR units and between the CGR components (e.g., components coupled via a TLN, allocate memory, I/O, and/or switch ports of CGR components, provide CGR component configuration data and initialization data, and can produce configuration files, e.g., processor-executable format (PEF) files. PNR 325 can provide bandwidth calculations, allocate network interfaces, provide configuration data for CGR components to perform memory address translation, and control switch and data routing among CGR components. PNR 325 can perform such functions in multiple steps and can include multiple modules (not shown in FIG. 3) to perform the multiple steps, e.g., a placer, a router, a port allocator, and a PEF file generator). PNR 325 can receive input data, for example, from any of the higher-level modules (dataflow graph compiler 321, algebraic graph compiler 322, template graph compiler 323, and/or template library 324). In implementations, a higher-level module, such as template graph compiler 323, can prepare information for PNR 325 and can omit other levels directly providing input data to PNR 325.

Implementations of compiler 320 compile applications in an iterative process, such as feeding information from PNR 325 back to a higher-level module, which can, in turn, execute a new compilation step using physically realized results, rather than estimates of, or logical placeholders for, physically realizable circuits. For example, PNR 325 can feed information regarding the physically realized circuits back to algebraic graph compiler 322.

Memory allocations can represent logical memory spaces in on-chip (a chip implementing a CGR component) and/or off-chip (a chip separate from a CGR component), CGR component memories, for data flowing through the dataflow graph; a configuration file, such as a PEF, can specify particular memory allocations. Memory allocations can define a type and number of CGR hardware memories and/or circuits (functional units, storage, or connectivity components). Main memories (e.g., DRAM) can be, for example, off-chip memories, and scratchpad memories (e.g., SRAM) can be on-chip memories, such as memories of a CGR array. Memory allocations can correspond to various access patterns and/or memory layouts, such as access patterns/layout of cache memories, read-only look-up tables (LUTs), serial memories (e.g., FIFOs), and/or register files.

Compiler 320 can bind memory allocations to unplaced memory units and can bind operations of a dataflow graph to unplaced compute units, for execution of a graph, and configuration data, such as in a PEF, can specify such bindings. In implementations, compiler 320 can partition parts of a dataflow graph into memory subgraphs and compute subgraphs, and can specify these subgraphs in configuration file. A memory subgraph can comprise, for example, address calculations leading up to a memory access. A compute subgraph can comprise, for example, compute operations (compute nodes) in a parent graph. A compiler can divide a parent graph into multiple memory subgraphs and a single compute subgraph, for example. A single parent graph can produce one or more memory subgraphs, depending on how many memory accesses exist in the original graph loop body. In cases where the same memory addressing logic is shared across multiple memory accesses, a compiler can duplicate address calculations to create multiple memory subgraphs from the same parent graph.

Compiler 320 can generate configuration files with configuration data (e.g., a bit stream) for the placed positions, and for routed data and control networks. In implementations this can include the compiler assigning coordinates and communication resources of the physical CGR components by placing and routing unplaced units of CGR components with a goal to maximize compute and/or data transfer bandwidth and minimizing compute and/or data transfer latency.

An application may not itself include backward nodes and, in implementations, a CGRS compiler, such as illustrated by the example of compiler 320, can determine that a model requires backward nodes, and can generate backward nodes in a computation graph. In determining a mapping of an application to CGR hardware resources, a CGRS compiler can identify recompute nodes and can determine section boundaries among forward nodes, backward nodes, and recompute nodes within a graph.

To exploit the full power of a CGRS—particularly, dynamically reconfigurable CGR components of a CGRS—a CGRS compiler must not only generate low level processor instruction sequences, but must also allocate reconfigurable resources of the underlying CGR hardware that can execute the application most efficiently, and with highest possible computational performance. A CGRS compiler must, further, determine controls to sequence transfer in (e.g., to a memory and/or compute unit), processing (e.g., compute unit and/or operator pipelining), and/or transfer out (e.g., from a memory and/or compute unit) of application data.

In optimizing parallelization and computational latency of among CGRS hardware resources, a CGRS compiler must consider complex factors, such as: the number of available processing units (e.g., processors of CGR components); the number, size, and transfer latency of memory units (e.g., memories of CGR components); computational latency of operators of the application; dependencies among operators; and, sections of an application that can execute in parallel, not only intrinsically, but also given the amount of CGRS hardware resources available to execute the sections. Such considerations can be referred to as "mapping factors".

In implementations a "mapping decision space" can comprise mapping factors. In addition, or alternative, to factors just described, the mapping factors can include parameters and/or attributes of an application and/or CGRS related to mapping factors. Mapping factors included in a mapping decision space can include, for example, descriptions and/or attributes of CGR components; configurations and/or arrangements of data nodes, compute nodes, and interconnections of nodes (edges) of a graph and CGR components; and/or, groupings ("section cuts") of operators of a graph into particular pipelines and sections. Mapping factors of a mapping decision space can include alternative such configurations and section cuts, and can include costs (e.g., hardware utilization, compute and/or data transfer bandwidth or latency) associated with the alternatives. Mapping factors of a mapping decision space can include optimization goals (e.g., optimizing utilization over latency, or vice versa) and/or priorities of execution of particular nodes of a graph.

Mapping decisions can comprise tiling alternatives to apply to operands/results matrices, alternative groupings of operators within pipelines and/or sections, and "PAR" (parallelization) factors associated with parallel execution of operators among alternative pipelines and/or section cuts. Mapping decisions can comprise, or be based upon, performance characteristics of mapping alternatives, such as computational latencies and/or CGRS hardware utilizations associated with different mapping decisions. Mapping decisions can include pipeline, tiling, and/or section cut options that can optimize particular performance characteristics (e.g., mapping decisions that can be preferred to optimize a particular performance characteristic of executing the application on CGRS hardware).

Figure 4A:
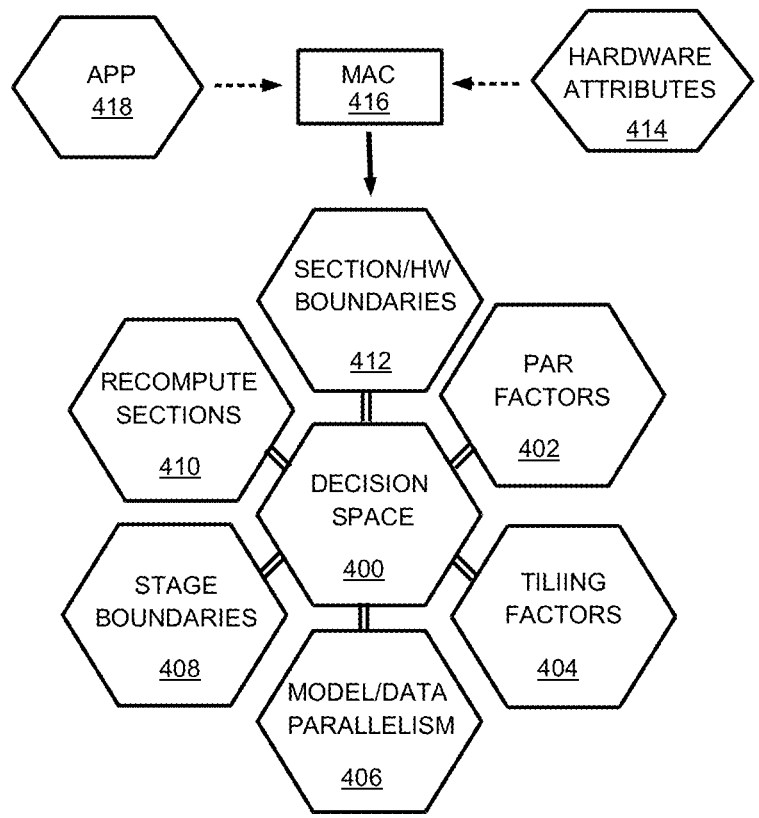
FIG. 4A illustrates an example mapping decision space, according to aspects of the disclosure.

FIG. 4A illustrates mapping factors and a mapping decision space a CGRS compiler can utilize in mapping operators and data of an application to underlying hardware resources of a CGRS (e.g., CGR components of a CGRS). A MAC component of a CGRS compiler, for example, can generate and/or analyze a computation graph of an application to determine mapping factors of a mapping decision space. For example, a MAC can traverse a graph, such as in the example of FIG. 2, to determine mapping factors of a mapping decision space.

In implementations, a compiler can determine a mapping of an application (e.g., operators and tensors included in a graph of an application) to CGR hardware resources for execution of the application. A compiler, or a MAC of a compiler, can include a hardware mapping component— referred to herein as a "mapper"—and the mapper can analyze a graph to map operators, tensors, and/or tensor dataflow of an application to CGR hardware for execution.

For purpose of illustrating the disclosure, example operations of the disclosure, such as example operations of FIG. 4A, are frequently described as performed by a MAC, and/or components of a MAC, of a CGRS compiler. However, this not intended to limit implementations and one of ordinary skill in the art will appreciate that a compiler need not necessarily comprise a CGRS compiler, a MAC of a CGRS compiler, and/or particular components (e.g., a mapper) of a compiler or a MAC to perform methods, and/or steps of methods, of the disclosure. Components of a compiler alternative to these particular components can perform methods and operations of the disclosure within the scope and spirit of the disclosure.

In FIG. 4A, decision space 400 is an example of a mapping decision space that a CGRS compiler can utilize to determine alternatives to map an application to CGR hardware for a CGRS to execute the application efficiently. Decision space 400 can represent a combination (not necessarily exhaustive) of mapping factors 402-412 (collectively, "mapping factors 400" in FIG. 4A) that a CGRS compiler can include in a mapping decision space such as example decision space 400.

In FIG. 4A, app 418 can comprise an application, and/or application model, (e.g., represented as a graph and/or textual representation) and MAC 416, in FIG. 4A, can be a MAC component of a CGRS compiler configured to compile app 418. MAC 416 can generate decision space 400 to execute app 418 on CGR hardware that can be represented by hardware attributes 414. In the example of decision space 400, mapping factors 400 are shown in FIG. 4A including PAR factors 402, tiling factors 404, model/data parallelism 406, stage boundaries 408, recompute sections 410, and section/HW boundaries 412.

PAR factors 402 can comprise, for example, parallelization ("PAR") factors included in a template (e.g., a template among template library 324 in FIG. 3) that can represent an intrinsic, or application programmer preferred, parallelization of model operators. Tiling factors 404 in decision space 400 can include alternative, and/or optimal, tiling of operator and/or pipeline input data, operand matrices, and/or operator results matrices. Tiling a graph refers to partitioning, or "slicing", operand/results matrices of tensor data input to, and output from, operators in the graph into smaller matrices ("tiles"). A MAC can tile the matrices based on, and/or to preserve, a particular, shared dimension of the matrices (e.g., a row dimension or a column dimension of the matrices). Model/data parallelism 406 can include boundaries of operator and data parallelism, which can represent, for example, a degree of parallelization of model operators and data. Stage boundaries 408 can include, for example, boundaries of pipeline stages of underlying CGRS and/or CGR component hardware.

Pipelines of operators can be possible along certain dimensions and/or tile sizes of operands/results tensors, and may not be possible among others. For example, a producer GEMM and consumer ADD operator can form a pipeline over dimension M of an M×N GEMM output tensor and M×J ADD addend tensor. Sizes of GEMM output and/or addend input tensor tiles can determine whether or not CGR hardware (e.g., a particular CGRP) can process a tensor. A CGRP executing the GEMM operator, for example, can require a tile size (e.g., to fit in a CGRP memory) different from that of a CGRP executing the ADD operator (or, vice versa), such that the two operators can form a pipeline only using tile sizes suitable for each of the two CGRPs. Tiling the GEMM output tensor and the ADD addend tensor on dimension M (e.g., forming two tiles of each tensor to have dimension M/2) can permit, or be necessary, to enable the CGR hardware to execute the ADD operation as a pipeline with the GEMM operator. Thus, tiling decisions can determine if successive operators in a graph can form a pipeline. In evaluating alternative tiling decisions, a mapper can evaluate dimensions and/or sizes of producer/consumer operator results/operands matrices to determine pipelines that can be formed based on those dimensions/sizes.

As illustrated in the examples of FIG. 2, a model can comprise sections. Operators that cannot be executed in parallel (e.g., operators that cannot be included in a pipeline with another operator) cannot be included in the same section of an application. Similarly, underlying CGR hardware can have limits to the number and/or type of operators that it can perform in parallel, and/or the amount of data it can process (e.g., based on sizes of memory to buffer or store input data and/or computation outputs). Thus, section/HW boundaries 412 can include boundaries, within a model or graph of a model, between forward and backward sections of the model, and/or boundaries of CGR hardware to execute operators within particular sections of a graph. Hardware boundaries among section/HW boundaries 412 can be based on a hardware description, and/or attributes of hardware, of CGR hardware, such as can be included in hardware attributes 414.

Backward nodes can be feedback paths, in the model, to recompute nodes, and the recompute nodes can be factors of decision space 400, such as to determine dependencies among sections and operators within sections. Recompute sections 410, for example, can represent combinations of operators that recompute particular application functions, such as recomputing activation functions using results (e.g., gradient adjusted matrices) of backward section operators.

In implementations, a compiler can represent an application, and/or a graph, using high level language (HL), intermediate level (IL), and/or low level (LL) language constructs and/or statements that can represent operators, operands/results of operators, and/or interconnections of the nodes and/or allocation of CGR hardware to execute the application. HL, IL, and/or LL representations can be, or can represent, an application graph or model. HL, IL, and LL language constructs/statements can describe nodes and edges of a graph, and/or instructions for executing the graph (i.e., executing the application as represented by the graph) on CGR hardware. HL, IL, and/or LL language constructs and/or statements can include compiler generated mapping alternatives and/or decisions as to how to map the application to CGR hardware for execution.

A compiler can generate a high level graph representation ("HLR") of an application. The compiler can utilize an HLR, for example, to analyze overall execution elements of the application, and/or to determine initial alternatives for mapping operations of the application to CGR hardware, such as tiling, section cut, and/or parallelization factors in mapping the application.

A compiler can generate, for example, an IL representation (ILR) of the graph that can incorporate mapping alternatives and/or decisions. For example, a compiler can translate an HL graph into an ILR such as an AIR graph and/or a TLIR graph. A compiler can compile, or translate, an ILR to an LL representation (LLR), such as a RAIL representation, that can describe configuration and/or execution instructions to execute the application using particular CGR hardware and/or configurations. The LLR can be suitable for generating application execution code specific to the CGR hardware, such as a PEF and/or configuration files. An ILR and/or LLR can be textual and or graphical, and can be another form of an application, or subset of an application.

A compiler can analyze graphs to determine execution parameters corresponding to CGR hardware allocated to execute the application. For example, a compiler can analyze an ILR (e.g., AIR) or LLR (e.g., RAIL) to determine execution latencies, processor/memory utilizations, and various other such metrics of application execution based on an IL or LL graph that includes CGR hardware resource allocations and/or execution on CGR hardware.

Figure 4B:
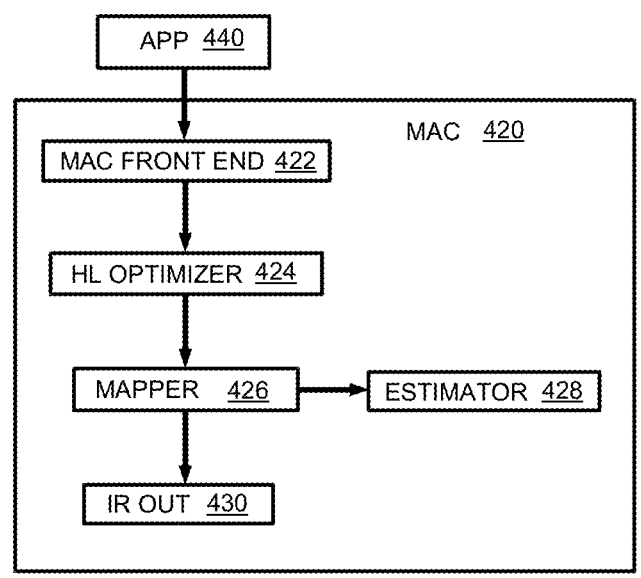
FIG. 4B illustrates an example structure of a model analyzer and compiler, according to aspects of the disclosure.

FIG. 4B illustrates example MAC 420, which can provide functions of a MAC such as MAC 416 in FIG. 4A. FIG. 4B depicts MAC 420 comprising MAC front end 422, HL optimizer 424, mapper 426, IR out 430, and estimator 428. In implementations, MAC front end 422 can comprise, for example, an API to input an application and/or application programming statements to compile for execution by a CGRS, shown in FIG. 4B as app 440. MAC front end 422 can comprise interfaces and/or functions to access hardware descriptions of the CGRS, to access or interact with other components of a compiler that includes MAC 420, and/or to access or interact with components of a host processor and/or the CGRS. MAC front end 422 can convert an application or application, such as app 440, to a graph and/or an intermediate representation (IR), for MAC 420 to determine mapping decisions to execute app 440.

HL optimizer 424 can perform high level optimization of app 440 and/or a graph of app 440, such as fusing operators (nodes) of a graph into higher level operators, eliminating no-ops and/or redundancies within app 440, and/or compute derivatives (e.g., Autodiff). In implementations, a compiler can determine a mapping of an application (e.g., operators and tensors included in a graph of an application) to CGR hardware resources for execution of the application. Mapper 426 can be a mapper component or function of MAC 420 that can determine mapping decisions to include in a mapping decision space, such as tiling, section cut, and/or parallelization decisions for mapping app 440 to CGR hardware for executing app 440.

Mapper 426 can utilize estimator 428 to determine, for example, model execution metrics such as computational latencies of CGRPs executing operators of app 440, data transfer latencies among memories of CGR hardware (e.g., memories of CGRPs executing operators of app 440), computational throughput among CGRPs executing operators of app 440, and/or amounts of memory required for operands/results tensor data of operators of app 440. Mapper 426 can output mapping decisions to IR out 430 and IR out 430 can translate, or otherwise convert, the mapping decisions to an intermediate representation of app 440 that includes mapping decisions to execute app 440 on the CGR hardware.

Figure 5:
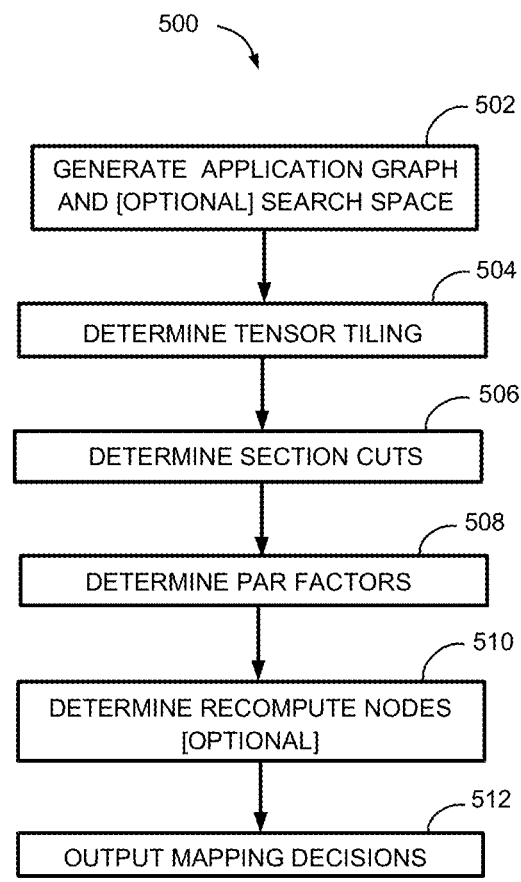
FIG. 5 illustrates an example method for performing multiple decision passes by a CGRS compiler, according to aspects of the disclosure.

FIG. 5 illustrates example method 500 for a CGRS compiler (hereinafter, in reference to method 500, "the compiler") to perform multiple decision passes to determine mapping decisions. The method is described as performed by a MAC and generating mapping decisions such as previously described; however, this is only to illustrate the disclosure and not intended to limit implementations. It would be appreciated by one of ordinary skill in the art that a CGRS compiler can analyze a graph in manners alternative to, or inclusive of, the example of method 500, and that any particular component, or combination of components, of a CGRS compiler, or components of a computing system alternative to a CGRS compiler, can perform the method, and/or steps thereof.

In step 502 of method 500, the MAC generates (or, alternatively, receives) a graph (hereinafter, in reference to method 500, "the graph") corresponding to a dataflow application, or application model corresponding to a dataflow application. The graph can comprise operators and operands/results matrices of the operators, and their arrangement, dependencies, and data flow among the operators, such as previously described. The graph can comprise an initial graph of an application and/or an auxiliary graph generated by the compiler based on an initial graph of an application model.

In implementations, applications, and corresponding graphs, can comprise tens of thousands of operators, and/or billions or even trillions of input/output tensor elements, executable on CGR hardware. Thus, mapping an application (e.g., mapping a graph) to CGR hardware can require substantial computation time and complexity. To improve efficiency of a CGRS compiler (e.g., a mapper) determining mappings—particularly, optimized mappings—of a model to CGR hardware, a CGRS compiler can generate a search space representing data and compute nodes of a graph, and their relationships (e.g., source and destination nodes within operator dataflows of the graph, as represented by edges of the graph). A search space can comprise attributes of operators, operands/results, such as operator type, dimensions of operand/results, size (e.g., number of elements) of operand/results dimensions, and so forth. Using a an API of a search space, a mapper can, for example, determine operators, and their associated input/output matrices, that can form such a pipeline (or, pipelines).

One example of a search space representing an application, or computation graph of an application, is a "Dimension-Based Search Space (DBSS). US Nonprovisional patent application titled "SEARCHING CONVOLUTIONAL NETWORK NODES BASED ON NAMED MATRIX DIMENSIONS," by Wang, et al, (hereinafter, "Wang") describes such a DBSS and is incorporated herein among the incorporated references of the disclosure.

Components of a CGRS compiler, such as a mapper, can utilize a search space, such as a DBSS, to determine mapping decisions. Accordingly, In step 502 the MAC can, optionally, generate a search space (hereinafter, for brevity, "the search space") that can include operators, operands/results matrices of the operators, and/or attributes of operators and/or operands/results matrices (e.g., dimensions, operator types, connection topologies, etc.).

In each of steps 504-510 of method 500, the MAC can traverse the graph and, optionally, query the search space, to determine attributes of the application model operators, operands, and/or results to further determine mapping decisions. A MAC, or a mapper of a MAC, can traverse a graph in a variety of alternative traversal orders, such as depth-first or breadth first topological orders, or combinations of these. The MAC can traverse the graph recursively within a topological order. The MAC can repeat steps among steps 504-510 to perform multiple mapping decision passes associated with the graph.

In step 504 the MAC determines tiling decisions to partition operand/results matrices of the application model. In determining tiling decisions, in step 504 the MAC can, optionally, determine performance characteristics of the tiling decisions and/or decisions that facilitate and/or inhibit forming pipelines.

In step 506 the MAC determines section groupings (section cuts) of the operators of the graph. The MAC can determine section cuts based on, for example, tiling decisions determined in step 504, and/or relationships among operators of the graph, such as data flow relationships, and/or types of operators among operators of the graph. In step 506 the MAC can query a search space to determine operators that can be combined into particular sections (section cuts) that group operators to form a pipeline.

In step 508 the MAC determines PAR factors associated with tiling alternative determined in step 504 and/or section cuts determined in step 506. The MAC can, in step 508, determine PAR factors based on, for example, performance characteristics of the decisions as executed by particular hardware components of a CGRS. In step 508 the MAC can determine the PAR factors based on a hardware description of CGRS hardware resources available to execute the application model.

In step 508 a MAC can determine PAR factors based, for example, on results of step 504 and/or step 506. PAR factors can include metrics such as a number of operands that can be processed in parallel within meat-pipes and/or pipelines; parallel or concurrent utilization of memories to execute particular operators and store their respective operands/results; staging of operands/results among various memories (e.g., "stage buffers") for execution by different operators; and/or, a number of particular compute units that can execute the model in parallel. In step 508, the MAC can query a search space to determine of different operators corresponding to section and/or tiling alternatives.

In step 510 the MAC can, optionally, determine a set of recompute nodes. As previously described, recompute nodes can comprise nodes of an application model for which some or all of their output tensor data can be recomputed during application execution, as an alternative to storing ("checkpointing") the output tensor data (e.g., in a memory or registers of a CGRP). Mapping decisions of a CGRS compiler can include "checkpoint solutions" that comprise checkpointing or recomputing output tensor data produced in forward and/or backward sections of an application graph. Identifying recompute nodes and determining associated checkpoint solutions is illustrated further in the examples of FIGS. 6-10.

In step 512 the MAC outputs mapping decisions (e.g., CGR hardware resource allocations, operand/results tiling decisions, PAR factors, and/or optimization metrics) from among the mapping decisions determined in steps 504-510. In step 512 the MAC can elect particular mapping decision sand output these as mapping decisions for execution of the model on CGR hardware. Alternatively, or additionally, the MAC can output all, or a subset, of mapping decisions as potential mapping decisions, and another component of the compiler, or of an CGRS for executing the application model, can elect particular mapping decisions as mapping decisions to configure CGR hardware and execute the application model.

In step 512 the MAC can output the mapping decisions to a mapping decision space (e.g., a data structure comprising mapping decisions), and/or to a search space. In step 512 the MAC can output the mapping decisions, for example to include in an IR of mapping decisions to execute the application model, and/or an aux graph of the application model.

Operators can output or persist results tensor data (e.g., a computational result of an operator function) in a memory for other forward and/or backward operators to perform computations using the results data (e.g., for a successor operator in a forward or backward section of an application, or for a backward operator to perform backward propagation computations using forward operator results tensors). As used herein, "checkpoint tensor" refers to tensor data computed by a node (operator) of an application model that can be checkpointed or can be recomputed (in whole or in part) during execution of an application. A checkpoint tensor can comprise a complete output tensor or can comprise a portion of an output tensor. Correspondingly, as used here, "checkpoint", used as a noun, refers to checkpoint tensor data persisted in a memory for subsequent use by a forward and/or backward consumer operator.

An execution system or, a processor of an execution system, such as a CGRS or CGRP, can store a checkpoint tensor in a memory until a consumer node can consume it (process the data as input to operator computations), or can recompute a checkpoint tensor, when needed by a consumer node, as an alternative to storing the checkpoint. "Checkpointing" a tensor, used herein as a verb, refers to an operation to store, or cache, a checkpoint tensor in a memory or other storage medium (e.g., registers) of an execution system, such as a memory or other storage medium of a CGRP.

However, checkpointing tensors can incur additional latencies for transferring the tensor data from one memory of an execution system (a memory of one CGRP) to another memory (e.g., a memory of another CGRP). In some cases, a CGRP may need to store a checkpoint tensor in a memory off-chip or, "remote", from a processor executing an operator of the application. Thus, checkpointing a tensor can increase execution latencies due to latency to transfer checkpoint tensor data to a memory remote from an operator producing the tensor data (e.g., a main memory, or a memory of a processor executing a consumer operator utilizing the checkpoint tensor data).

As an alternative to checkpointing a tensor, a CGRS can take advantage of additional and/or under-utilized processors to trade compute power for memory bandwidth, by recomputing a checkpoint tensor as opposed to checkpointing the tensor data. As used herein, "recomputing" a tensor means recomputing data of an output tensor, during execution of an application when that tensor data is needed for processing by a consumer node, as an alternative to checkpointing that data. Recomputing checkpoint tensors, in implementations, can enable a CGRS to store or cache only some checkpoint tensors needed by a consumer operator and recompute tensor data when needed by that or another consumer operator during application execution. A CGRP can overlap recomputation of checkpoints with other forward and/or backward computations, and/or memory transfers.

In implementations a "checkpoint solution" can comprise recomputing or, alternatively, checkpointing a checkpoint tensor during execution of the application by an execution system (e.g., a CGRS). A checkpoint solution can further include a selection, and/or configuration, of nodes of an application model, and/or CGR hardware resources, to recompute and/or checkpoint a tensor. A checkpoint solution can include, for example, a list of nodes of an application graph for which to recompute their output tensor data and/or a list of nodes for which to checkpoint their output tensor data. A checkpoint solution can include processing and/or memory costs associated with producing, checkpointing, and/or recomputing a checkpoint; a list of checkpoints to store; nodes that produce a checkpoint; and/or particular memories to store a checkpoint.

A CGRS compiler can incorporate a checkpoint solution into a graph (e.g., an auxiliary graph), a search space, compiler outputs to a user (e.g., a programmer of an application), mapping inputs/decisions, and so forth. A CGRS compiler can utilize a checkpoint solution, and/or elements of a checkpoint solution, to perform other functions of the compiler, such as determining mapping decisions, compiling a graph to an HL, ML, and/or LL representation, and/or interacting with a user (e.g., an application programmer) to modify an application model. A CGRS compiler can include a checkpoint solution in mapping decisions to execute an application on hardware resources of an execution system (e.g., a CGRS).

Figure 6:
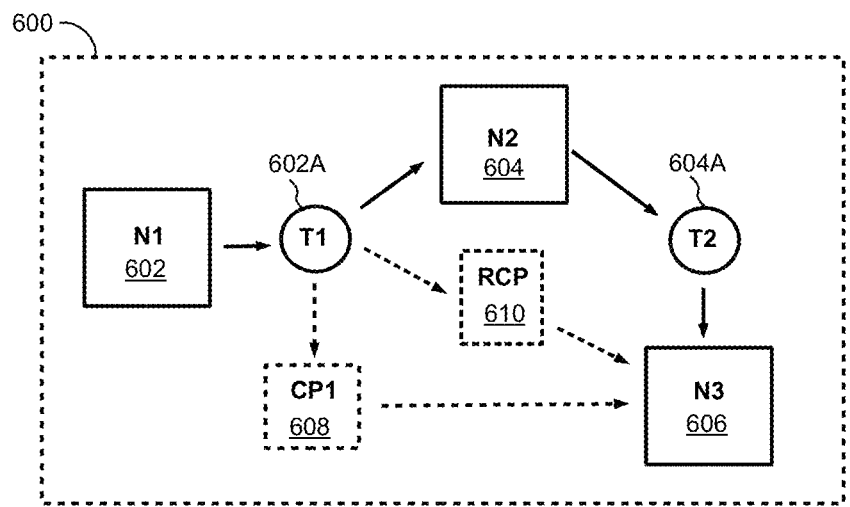
FIG. 6 illustrates an example of checkpointing versus recomputing tensor data, according to aspects of the disclosure.

FIG. 6 illustrates an example of a section of a graph in which tensor data input to a node can be either checkpointed or recomputed. In FIG. 6, producer node N1 602 produces tensor data T1 602A, which is shown as input data to consumer node N2 604. Node N2 604 is shown producing tensor data T2 604A, which is input data to consumer node N3 606. In implementations node N1 602, node N2 604, and node N3 606 can be, for example, operators in a forward section of the graph, operators in a backward section of the graph, or a combination of operators in forward and backward sections of the graph.

Node N3 606 is shown also receiving tensor data T1 602A as input data, such that tensor data T1 602A can comprise a checkpoint tensor. A CGRS compiler can determine a checkpoint solution in which tensor data T1 602A is checkpointed (stored) in a memory as checkpoint CP1 608. The compiler can determine an alternative checkpoint solution in which an available processor of an execution system can recompute tensor data T1 602A when required by node N3 606 as input data, as opposed to checkpointing tensor data T1 602A in a memory.

In FIG. 6 RCP 610 represents a processor that an execution system can allocate, during execution of the nodes of section 600, to recompute the tensor T1 602A data when required by node N3 606. As will be seen in the discussion of method 800 in FIG. 8, to follow, a CGRS compiler can determine a checkpoint solution that can include recomputing a checkpoint tensor, such as tensor T1 602A, based on an execution system having available hardware resources (e.g., a processor corresponding to RCP 610) to recompute data of tensor T1 602A when that data is needed as an input to other forward and/or backward nodes of a graph.

Recomputing a checkpoint tensor, as opposed to checkpointing a tensor in a memory, can be advantageous under some circumstances but may not be advantageous under other circumstances. For example, execution of an application can be "bandwidth bound", with respect to bandwidth of memories and/or memory interconnections to output tensor data from a producer operator to a memory to store the checkpoint tensor, or for a consumer operator to access a checkpoint tensor in a memory of an execution system. In such cases, it can be advantageous for a compiler to allocate processor resources to recomputing tensor data if it can save or improve memory bandwidth. Thus, recomputing a tensor can be an efficient tradeoff against memory bandwidth to checkpoint that tensor data in a memory. A CGRS compiler can compare relative costs of checkpointing and recomputing a checkpoint tensor to determine if recomputation can yield better application execution performance than checkpointing the tensor data in a memory, or vice-versa.

Recomputing can be more advantageous than checkpointing a tensor, or vice versa, for example, if one checkpoint solution improves overall application execution performance (lower latency, or higher throughput) in comparison to the other, and/or if one option improves execution system hardware utilization in comparison to the other. Recomputing one or more checkpoint tensors can, for example, eliminate application execution inefficiencies associated with storing and/or accessing checkpoint tensor data in a memory (e.g., to overcome bandwidth limitations that can idle processors). Alternatively, checkpointing tensor data can be necessary in cases in which processing resources are not available, during application execution, to recompute tensor data in parallel with other processing of an application (e.g., processing of backward and/or forward nodes of a graph of the application).

To determine checkpoint solutions, such as recomputing versus checkpointing a tensor, a CGRS compiler can determine recompute nodes of a graph, and/or other representations of an application model, and can apply a "recompute cost model" (RC model) to evaluate alternative checkpoint solutions associated with the recompute nodes based on a "solution cost. In implementations an RC model can determine a solution cost corresponding to recomputing and/or checkpointing a checkpoint tensor, or a portion of a checkpoint tensor. A solution cost can include, for example, a recompute cost to recompute checkpoint tensor data, a memory cost to checkpoint the checkpoint tensor in a memory, and/or a recompute ratio that can represent a relative difference between a recompute cost and a memory costs associated with a checkpoint tensor. An RC model can determine a recompute cost associated with recomputing checkpoint tensor data; can determine a memory cost associated with checkpointing that checkpoint tensor data; and/or can compute a recompute ratio based on a recompute cost and a memory cost.

Recomputing a checkpoint can require repeating all computations required to produce the checkpoint, such as recomputing all nodes (repeating the operations of all nodes) that produce that checkpoint. Recomputing some or all of a checkpoint tensor can comprise, then, computations of multiple nodes that, collectively, produce a checkpoint tensor. An associated recompute cost can include, for example, a total number of operations (e.g., compute and/or data transfer operations) performed by one or more nodes to produce checkpoint tensor data; a total number of processor instruction or processor cycles performed by one or more nodes to produce checkpoint tensor data; and/or, a total utilization of one or more processors to produce a checkpoint tensor. Components of a recompute cost, such as a number of processor instructions or cycles, can be based on, and/or correspond to, design parameters of execution system (e.g., CGRS) hardware to execute one or more nodes to produce a checkpoint tensor.

A memory cost can correspond, for example, to a measure of memory traffic to store or access a checkpoint tensor. Such measures can include, for example, a size (e.g., number of bytes) of a checkpoint tensor, or a portion of a checkpoint tensor, to store in a memory. A memory cost can include, or can be based upon, access latencies for a processor to store or access checkpoint tensor data in a memory, and/or a bandwidth of a memory or network of an execution system (e.g., a top line or switching network) to store or access checkpoint tensor data in a memory, and/or to transfer checkpoint data among memories (e.g., from a memory of a producer node to a memory of a consumer node). Components of a memory cost, such as a memory or memory interconnect bandwidth, can be based on, and/or correspond to, design and/or performance parameters of memories, and/or of execution system hardware (e.g., memory and/or processor interconnection hardware), to store checkpoint tensor data in, retrieve checkpoint data from, and/or transfer checkpoint data among memories of an execution system.

A recompute ratio can comprise a ratio of a recompute cost to a memory cost and can serve as a comparative measure to trade compute resources (e.g., based on a recompute cost) for memory resources (e.g., based on a memory cost), or vice versa, during execution of an application. For example, a recompute ratio can comprise a ratio of a total number of operations (e.g., processor instructions or cycles) to a number of bytes of a checkpoint tensor to store in a memory. In another example, a recompute ratio can comprise a ratio of a total computational execution time (e.g., a sum of processor cycle times) to recompute a checkpoint tensor to a total data transfer time (latency) to store a checkpoint tensor, or to access a checkpoint tensor, in a memory, or to a total transfer time to transfer checkpoint tensor data from one memory (e.g., a producer node memory) to another memory (e.g., a consumer node memory). An RC model can compute a recompute ration and can evaluate a checkpoint solution based on a comparison of the recompute ratio to a solution threshold corresponding to trading computation bandwidth for memory bandwidth.

In implementations an RC model can determine a checkpoint solution based on comparing a solution cost to a "solution threshold". A solution threshold can be, for example, an input to a CGRS compiler (e.g., a user-specified ratio), or can be included in, or otherwise known to, a CGRS compiler (or, an RC model of a compiler) for mapping an application to CGR hardware. In comparing a solution cost to a solution threshold, a solution cost that exceeds (or, alternatively, does not exceed) the solution threshold can indicate that a more optimal checkpoint solution can be to checkpoint output tensor data. Alternatively, a solution cost that does not exceed (or, alternatively, exceeds) the solution threshold can indicate that a more optimal checkpoint solution can be to recompute output tensor data when needed by a consumer operator. In an example utilizing a recompute ratio, a ratio that exceeds a solution threshold (e.g., a number of recompute operations compared to a size of a checkpoint tensor), for example, can indicate that a more optimal checkpoint solution is to checkpoint the tensor, while that ratio not exceeding that solution threshold can indicate that a more optimal checkpoint solution is to recompute the tensor.

Solution costs and/or solution thresholds can correspond to particular application (or, model) execution objectives or priorities. Execution objectives and/or priorities to execute an application can include, for example, increasing execution throughput; decreasing execution latency; decreasing, increasing, or limiting memory utilization; decreasing, increasing, or limiting particular processor, or overall, processor utilization; decreasing, increasing, or limiting memory to memory transfers; decreasing, increasing, or limiting use of particular memories; decreasing, increasing, or limiting an amount of checkpoint tensor data to store in particular memories; and/or, decreasing, increasing, or limiting data transfer among particular memories. An execution objective can include recomputing a checkpoint tensor if the recomputation requires less than a particular computational threshold, such as fewer than a particular number of processor instructions or cycles. An alternative execution objective can include, for example, checkpointing a checkpoint tensor if the tensor data requires less data than can be stored in a particular memory, or requires less bandwidth than available to transfer the checkpoint tensor into or out of a particular memory.

These examples of solution costs and solution thresholds are not intended, however, to be exhaustive or limiting to implementations. It will be appreciated by one of ordinary skill in the art that a solution cost and/or solution threshold can correspond to any variety of metrics representing costs, and/or cost thresholds, associated with checkpointing or recomputing tensor data in a particular execution system. A solution cost and/or solution threshold can correspond to, or be associated with, particular processors and/or memories an execution system; performance characteristics of particular processors and/or memories of an execution system; transfer of data into, out of, and/or between memories of an execution system; and/or configurations of processors and/or memories of an execution system.

Figure 7:
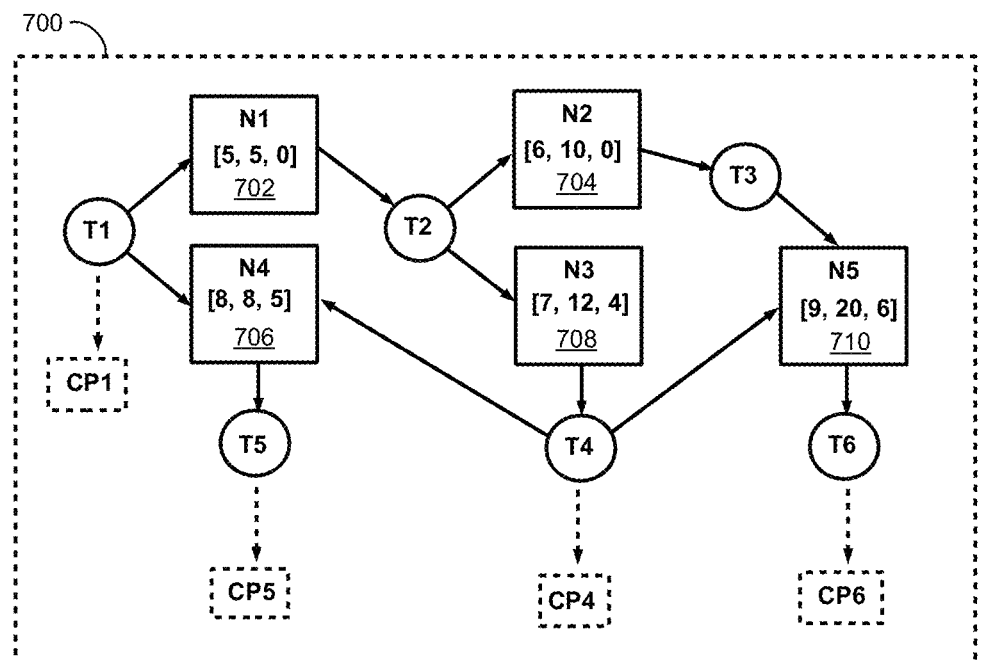
FIG. 7 illustrates an example graph having checkpoint tensors, according to aspects of the disclosure.

To further illustrate determining a checkpoint solution based on a solution cost compared to a solution threshold, FIG. 7 depicts example section 700 of an application graph that includes tensors computed (output) by nodes of section 700. For purposes of illustrating the disclosure, but not intended to limit implementations, the example of section 700 in FIG. 7 illustrates applying an RC model to compute a recompute ratio and compare the recompute ratio to various alternative solution thresholds corresponding to a recompute ratio. However, one of ordinary skill in the art will appreciate that an RC model can incorporate recompute costs, memory costs, recompute ratios, and/or solution thresholds other than as illustrated in FIG. 7.

As previously described, in implementations, a recompute ratio greater (or, alternatively, no greater) than a solution threshold can indicate, for example, that processing resources to recompute a tensor are more costly than the cost of storing tensor data as a checkpoint. Alternatively, a recompute ratio equal to or less than (or, alternatively, greater than) a solution threshold can indicate that recomputing a tensor is less costly than storing tensor data as a checkpoint. To illustrate the examples of FIG. 7, but not intended to limit implementations, a recompute ratio above (greater than) a solution threshold can indicate that checkpointing a checkpoint tensor can be advantageous (in view of a model execution objective) to recomputing a tensor. Correspondingly, a recompute ratio below (less than or equal to) a solution threshold can indicate that recomputing a checkpoint tensor can be advantageous (in view of a model execution objective) to storing the tensor data as a checkpoint.

Turning now to details of FIG. 7, section 700 is shown comprising nodes N1 702, N2 704, N3 708, N4 706, and N5 710 (hereinafter, collectively "nodes 710"), having input/output tensors T1-T6. FIG. 7 illustrates tensors T1, T4, T5, and T6 as corresponding to checkpoints CP1, CP4, CP5, and CP6 (collectively, "CPs 700"). Checkpoint CP1 can comprise tensor data produced (computed) by another node, not shown in FIG. 7, that can input tensor T1 to nodes N1 702 and N4 706. Checkpoints CP4, CP5, and CP6 can comprise tensor data produced (computed) by respective nodes N4 706, N3 708, and N5 710. CPs 700 can be checkpoint tensors needed as inputs to node of section 700 and/or other nodes (not shown in FIG. 7) to perform other forward and/or backward computations.

In analyzing section 700 a CGRS compiler can determine that tensors T1, T5, T4, and T6 are candidates for checkpointing—as respective checkpoints CP1, CP5, CP4, and CP6—or, alternatively, that nodes N1 702, N4 706, N3 708, and N5 710 can be candidate recompute nodes of section 700 to recompute respective tensors T5, T4, and/or T6. While tensor T1 illustrates an input tensor not computed in section 700, a CGRS compiler can utilize an RC model to also evaluate tensor T1 for possible inclusion in a checkpoint solution.

In an application model, producing (computing) a particular checkpoint tensor can have a recompute cost corresponding, for example, to a total, accumulated number of operations (e.g., computations) executed by one or more nodes of a graph to ultimately produce that tensor. Similarly, checkpointing tensor data can have a memory cost. A memory cost can correspond to, for example, data traffic (e.g., memory and/or data bus traffic), and/or a type of a memory (e.g., an on-chip versus off-chip memory, or a particular level of a memory in a hierarchical cache) associated with checkpointing the tensor data in a memory. Data traffic can be represented numerically by, for example, an amount of data to checkpoint. A type of a memory to store a checkpoint can have a numerical representation corresponding to a particular characteristic of the memory, such as bandwidth.

A recompute ratio corresponding to a checkpoint tensor can comprise, in one example, a ratio of the total number of operations, summed across all nodes that participate in producing the checkpoint tensor, to a memory cost to checkpoint the tensor data. To illustrate in more detail, in FIG. 7 each node in section 700 is shown having a 3-tuple of recompute costs, [M1, M2, M3], in which M1 can be a number of operations intrinsic to that node to compute a tensor; M2 can be a number of operations accumulated over multiple nodes to compute the tensor, including the intrinsic ops of that node; and, M3 can be a memory cost associated with checkpointing the tensor (e.g., representing an amount of tensor data to checkpoint). Accumulated operations can comprise, for example, the intrinsic number of computational operations of a node plus a sum of the number of intrinsic computational operations of all producer nodes that feed forward to the final producer node that produces (finally computes and outputs) the tensor.

Figure 8:
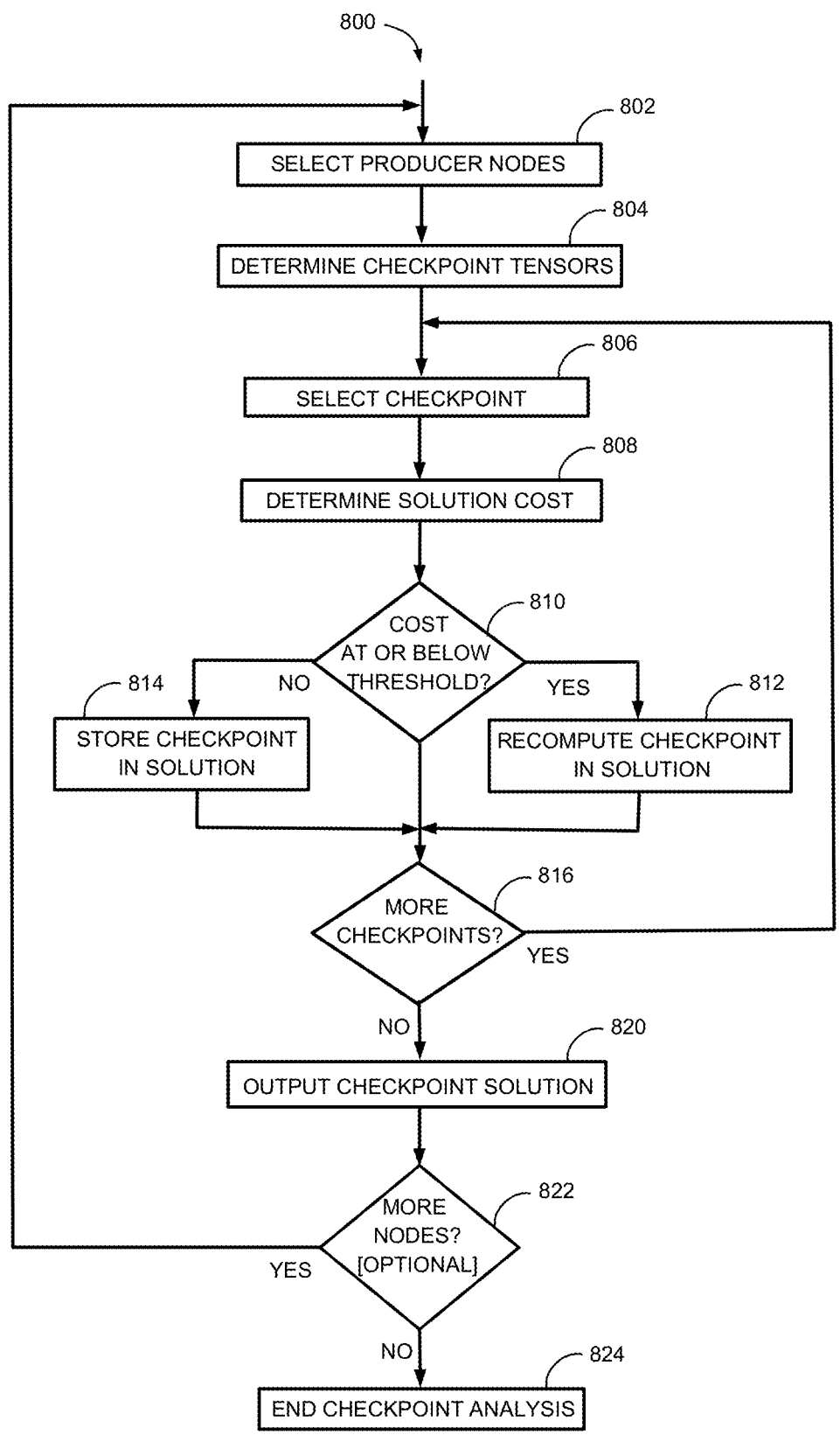
FIG. 8 an example method for determining recompute alternatives, according to aspects of the disclosure.

In FIG. 7 node N1 702 is shown having an intrinsic number of ops (M1) equal to 5 and an accumulated number of ops (M2) also equal to 5, as node N1 is an initial consumer node in section 700 (as is also node N4 706). Node N1 702 is further shown having a memory cost (M3) equal to "0", as it does not directly generate a tensor, among tensors T5, 54, and T6, to evaluate for checkpointing versus recomputing. Other nodes are shown in FIG. 8 having respective recompute cost 3-tuples including accumulated ops, M2, of nodes that are producer nodes of their input operands. However, values of the 3-tuples in FIG. 7 are for purposes of illustrating the disclosure, and do not necessarily correlate to any particular actual application model values.

A CGRS compiler can use the 3-tuples of nodes in section 700 (and/or, other compute and/or memory cost parameters) to compute a recompute ratio, such as a ratio of a total number of operations (intrinsic plus accumulated operations) to produce a checkpoint tensor to a memory cost associated with checkpointing that tensor. The compiler can compare the recompute ratio to differing solution thresholds to determine differing checkpoint solutions for a particular graph. Particular solution thresholds can be specified by a user (e.g., as a parameter of an application model, or a CGRS compiler API), and/or can be associated with particular application execution objectives. Additionally, or alternatively, a compiler can determine solution thresholds based on, for example, particular CGR hardware designs, resources, and/or capabilities, and/or based on particular application execution objectives (e.g., application execution time or throughput, CGR hardware utilization, etc.).

As shown in FIG. 7, nodes N4 706, N3 708, and N5 710 have recompute ratios of 1.6, 3.0, and 3.3 to produce respective tensors T5, T4, and T6. As compared to a solution threshold value of 1 (as one example threshold value for illustration) recompute ratios of nodes N4 706, N3 708, and N5 710 to produce respective tensors T5, T4, and T6, are all greater than 1. Thus, in this case there may be no benefit to recompute (repeat computations of all nodes involved in producing) any of tensors T5, T4, and T6 versus checkpointing T5, T4, and T6. A checkpoint solution can therefore comprise checkpointing all of tensors T5, T4, and T6.

Using, as another example threshold value, a value of 1.7, it can be advantageous to recompute tensor T5 (i.e., re-execute node N4 706), as node N4 706 has an associated recompute ratio of 1.6 to produce tensor T5, less than the solution threshold of 1.7. However, may not be advantageous to recompute tensors T4 and T6, as the recompute ratio of node N3 708, to produce T4 is 3.0 and the recompute ratio of node N5 710, to produce T6, is 3.3, both of which are greater than the solution threshold value of 1.7. Thus, in this example, a checkpoint solution can comprise recomputing T5 and checkpointing tensors T4 and T6 as respective checkpoints CP4 and CP6.

In comparison to a third example solution threshold of 3.5 it can be advantageous to recompute all of tensors T5, T4, and T6 (i.e., re-execute all of nodes N1 702—N5 710 computations), as recompute ratios of all of nodes N4 706, N3 708, and N5 710, to produce respective tensors T5, T4, and T6, are less than the solution threshold value of 3.5. Thus, in this example, a checkpoint solution can comprise recomputing tensors T5, T4, and T6 and not checkpointing any of tensors T5, T4, and T6.

FIG. 8 illustrates example method 800 for a CGRS compiler (hereinafter, in reference to method 800, "the compiler") to apply an RC model to a graph to determine checkpoint solutions. A dataflow compiler can, for example, perform method 800 to determine recompute nodes (e.g., to perform step 504 of method 500). Method 800 is described, herein, as performed by a MAC ("the MAC", in reference to method 800) component, and/or function, of a CGRS compiler. In implementations, the MAC can analyze an application model (e.g., a graph of the model) to determine checkpoint solutions in executing the model. Further, the example of method 800, is described, herein, as performed by the MAC utilizing an application graph ("the graph", in reference to method 800) of the application.

However, this is for purposes of illustrating the method and is not intended to limit implementations. It will be appreciated by one of ordinary skill in the art that any program and/or function of a computing system, and any type of compiler designed to compile dataflow applications, can perform steps of method 800, and/or that any such program or compiler can apply steps of method 800 to any representation of an application model other than a graph or IR.

Turning now to details of method 800, in step 802 of method 800 the MAC selects a set of producer nodes in the graph that can potentially produce tensors utilized in other forward and/or backward node computations of the graph (e.g., can produce tensors input to consumer nodes of the graph). In step 802 the MAC can select the set of producer nodes from among all nodes of the graph or, alternatively, from among a subset of nodes of the graph.

In step 804 the MAC determines potential checkpoint tensors produced by the nodes. Using section 700 of FIG. 7 to illustrate, in step 802 the MAC can select nodes of the graph corresponding to nodes N4 706, N3 708, and N5 710 to determine potential checkpoint tensors in FIG. 7 and, in step 804, the MAC can determine that tensors T5, T4, and T6 in FIG. 7 are tensors that can be checkpointed or, alternatively, recomputed during application execution.

In step 806, the MAC selects a checkpoint tensor from among those determined in step 804 and, in step 808, the MAC determines, or computes, a solution cost to evaluate checkpointing versus recomputing the checkpoint tensor selected in step 806. As previously described, a solution cost determines or computed, by the MAC in step 808, can include a recompute cost, a memory cost, and/or a recompute ratio. In step 808 the MAC can apply an RC model to compute the solution cost.

In step 810, the MAC compares the solution cost determined or computed in step 808 to a corresponding solution threshold value. The solution threshold can correspond to execution objectives such as previously described. The solution threshold can be, for example, a value of a solution cost below which recomputing a checkpoint can have an advantage over checkpointing the checkpoint tensor, to achieve an execution objective. Alternatively, The solution threshold can be a value of a solution cost above which checkpointing the checkpoint tensor can have an advantage over recomputing the checkpoint tensor, to achieve an execution objective.

If the MAC determines, in step 810, that the solution cost computed in step 808 is at or below (for example) the solution threshold, in step 812 the MAC can include recomputing the checkpoint in the checkpoint solution. Alternatively, if the solution cost computed in step 808 is above (for example) the solution threshold compared in step 810, in step 814 the MAC can include storing the checkpoint in the checkpoint solution.

In step 816, the MAC determines if there are more tensors to evaluate among the potential checkpoint tensors determined in step 804. If so, the MAC repeats steps 806-816. Otherwise, in step 820 the MAC outputs a checkpoint solution for the checkpoint tensor selected in step 806. In step 820, the MAC can output the solution as recommendations to a user of the system (e.g., a programmer of the application), as modifications to a graph of the application, as elements of a search and/or decision space, and/or as data of an IR of the application model or a data structure, for example. In step 820, the MAC can output a set of checkpoint solutions accumulated over repetitions of step 802 to step 816.

In step 822, the MAC can, optionally, determine if there are more producer nodes or, alternative sets of producer nodes, to evaluate for possible checkpoint tensors. If so, the MAC can repeat steps 802-822 to select and can analyze additional nodes, and/or nodes previously analyzed with respect to possible alternative checkpoint solutions. If, in step 822, the MAC determines there are no additional nodes to analyze, in step 824 the MAC ends checkpoint analysis of the graph or, alternatively, of a selected subset of the graph. If the MAC, optionally, omits step 822, in conjunction with step 820 the MAC can perform step 824. In ending the checkpoint analysis, in step 824 the MAC can output one or more checkpoint solutions (or, store checkpoint solutions in a memory or storage device as input checkpoint solutions) to components of the compiler to perform other application compilation operations.

Figure 9:
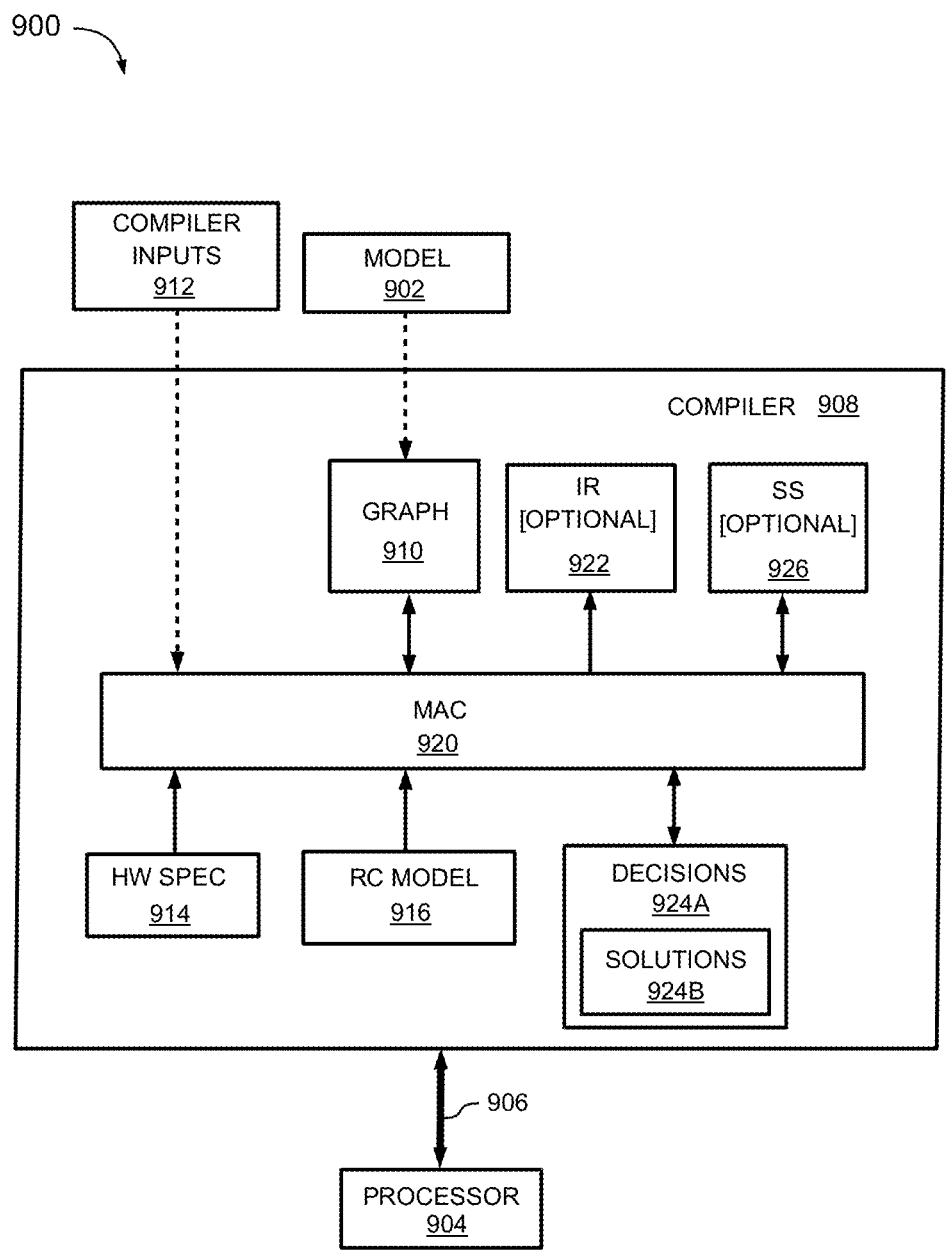
FIG. 9 illustrates an example compiler for performing methods of the disclosure, and/or operations thereof, according to aspects of the disclosure.

FIG. 9 illustrates an example system for analyzing a graph and determining checkpoint solutions. In FIG. 9, computing system 900 is shown comprising model 902, processor 904, compiler 908, and compiler inputs 912. In implementations, model 902 can be an application model corresponding to any form of a dataflow and/or data-parallel application, such as a neural network and/or application for performing functions of dataflow and/or data-parallel processing.

Compiler 908 can comprise a compiler suitable for compiling an application model to execute on a computing system, such as a CGRS compiler for compiling an application model for execution on a CGRS, and/or on CGR hardware of a CGRS. Compiler 908 can be a compiler, for example, such as described in reference to the examples of method 500 of FIG. 5 and/or method 800 of FIG. 8.

Processor 904 can be any processor, and/or a computing system including a processor, that can execute programs of a compiler such as compiler 908. For example, processor 904 can comprise one or more processors of a host computing system that can execute compiler 908. Processor 904 is shown coupled to compiler 908 by means of interface 906. In implementations interface 906 can include, for example, an API for executing compiler 908 on processor 904, for compiler 908 to receive input data, such as model 902, compiler inputs 912, and/or IR 922, which can comprise an IR of graph 910. Interface 906 can include an API for compiler 908 to output data, such as a graph, a search space (e.g., a DBSS), and/or an IR of a graph (e.g., 1R 924B). Interface 906 can include communications and/or hardware interfaces, such as I/O buses/links, networks/network interfaces, one or more memories, and/or storage media for storing and/or processor 904 to process compiler 908 input and/or output data.

FIG. 9 further depicts compiler 908 comprising graph 910, optional search space SS 926, hardware specification HW SPEC 914, RC model 916, MAC 920, decisions 924A, and optional IR 922. In implementations, graph 910 can be a graph corresponding to model 902. Compiler 908 can generate SS 926 based on graph 910 and/or IR 922. Search space SS 926 can be, for example, a DB search space, such as previously described. HW SPEC 914 can include specifications to describe characteristics of CGR hardware that can execution model 902.

Compiler 908 can receive model 902 (e.g., via interface 906, or another interface of compiler 908 not shown in FIG. 9) and compiler 908 can generate graph 910 and/or IR 922 based on model 902. Alternatively, compiler 908 can receive graph 910 and/or IR 922 from a storage device or memory storing graph 910 and/or IR 922 (e.g., storage or memory storing graph 910 and/or IR 922 from a prior creation of graph 910 and/or IR 922).

Graph 910 can be an auxiliary graph; IR 922 can be an IR generated by compiler 908 from graph 910. In implementations, IR 922 can comprise an HL, IL, and/or LL representation of an application model and/or checkpoint solutions and/or application mapping alternatives/decisions. IR 922 can comprise HL, IL, and/or LL constructs and/or statements, a schematic representation of operators and their associated operands/results, or a combination of these. IR 922 can be machine readable, human readable, or a combination of machine and human readable constructs, language statements, and/or schematic representations. IR 922 and graph 910 can be one and the same.

Compiler inputs 912 can comprise application programming statements, compiler directives, and/or parameters to compile the application corresponding to model 902. Compiler inputs 912 can comprise recompute costs, memory costs, solution thresholds, and/or information for compiler 908 to compute recompute costs, memory costs, solution costs, and/or compare solution costs to solution thresholds. Compiler inputs 912 can comprise recompute costs, memory costs, and/or solution thresholds such as previously described. Recompute costs and/or solution thresholds included in compiler inputs 912 can correspond to computation of recompute nodes of graph 910 and/or IR 922 to produce checkpoint tensors of graph 910 and/or IR 922, and/or correspond to specifications of CGR hardware, such as can be represented in HW SPEC 914. Memory costs and/or solution thresholds included in compiler inputs 912 can comprise memory costs such as previously described, and can correspond to memories of CGR hardware, such as can be represented in HW SPEC 914.

RC model 916 can comprise a recompute cost model and can include functions, criteria, and/or computations (e.g., computations of recompute costs, memory costs, and/or recompute ratios) to determine checkpoint solutions associated with recompute nodes and/or checkpoints of graph 910. RC model 916 can utilize recompute costs, memory costs, and/or solution thresholds included in compiler inputs 912 and/or hardware specifications HW SPEC 914, to determine recompute costs, memory costs, and/or recompute ratios, and/or to compare recompute costs, memory costs, and/or recompute ratios to corresponding solution thresholds.

RC model 916 can include, or can perform recompute computations/evaluations based on, execution objectives associated with executing model 902 on a particular CGR hardware design, and/or particular CGR hardware resources available to execute model 902. Such execution objectives can be represented by thresholds corresponding to recompute costs, memory costs, and/or recompute ratios. Based on comparing the costs/ratios to the corresponding thresholds, RC model 916 can determine a checkpoint solution associated with a particular recompute node or checkpoint tensor of graph 910 and/or IR 922.

MAC 920 can be a MAC such as previously described. MAC 920 can perform a method, such as method 500 of FIG. 5 and/or method 800, of FIG. 8 to analyze graph 910, determine checkpoints to evaluate, and determine checkpoint solutions associated with the checkpoints to evaluate. MAC 920 can apply RC model 916 to determine recompute costs, memory costs, and/or recompute ratios, and to compare the costs and/or ratios to corresponding thresholds, to determine checkpoint solutions associated with graph 910. As a result of analyzing graph 910 or, alternatively, one or more subsets of graph 910, MAC 920 can output checkpoint solutions of graph 910 to solutions 924B. MAC 920 can, additionally or alternatively, output checkpoint solutions of graph 910 to graph 910 and/or IR 922.

Decisions 924A can comprise mapping decisions, such as mapping decisions determined by MAC 920. MAC 920 can determine mapping decisions among decisions 924A using a method such as method 500 of FIG. 5 and/or method 800 of FIG. 8. Decisions 924A can be based on graph 910/IR 922 and/or HW SPEC 914, and can include tiling, section cut, and/or parallelization decisions. Decisions 924A are shown including solutions 924B, which can comprise checkpoint solutions determined by MAC 920 using RC model 916, and/or otherwise based on recompute costs, memory costs, and/or solution thresholds included in compiler inputs 912.

The example of FIG. 9 is intended only to illustrate example components, and arrangements thereof, of a system capable of checkpoint solutions corresponding to an application model and/or to a graph and/or IR corresponding to an application model. However, the examples of FIG. 9 are not intended to limit implementations. It will be appreciated by one of ordinary skill in the art that such a system can comprise a variety of components, and/or arrangements of components, alternative to the example of FIG. 9, that can perform methods and/or operations of the disclosure within the scope and spirit of the disclosure.

While not shown explicitly in FIG. 9, in computing system 900 compiler inputs 912, graph 910, SS 926, HW SPEC 914, IR 922, and/or components of these, can be stored in a storage medium and/or memory included (but, not shown explicitly) in, or coupled to, computing system 900, and/or accessible to processor 904. Programming instructions for compiler 908 to perform methods and/or operations of the disclosure can be stored in a storage medium and/or memory included (but, not shown explicitly) in, or coupled to, computing system 900, and/or accessible to processor 904.

In implementations, a storage medium can comprise any form of persistent memory or medium, such as a disk or optical storage device, or a storage medium of a computer storage subsystem. A memory can comprise any computer memory that can be accessible to compiler 908, and/or processor 904 while executing programs of compiler 908. For example, while not shown explicitly in FIG. 9, computing system 900 can include a main memory, on-chip and/or off-chip memories of a CGRP, cache memories, and/or memories of a CGRS (e.g., PMUs, register stacks, scratchpad memories, and/or SRAMs of CGRPs, and/or DRAMs of CGRS nodes).

Figure 10:
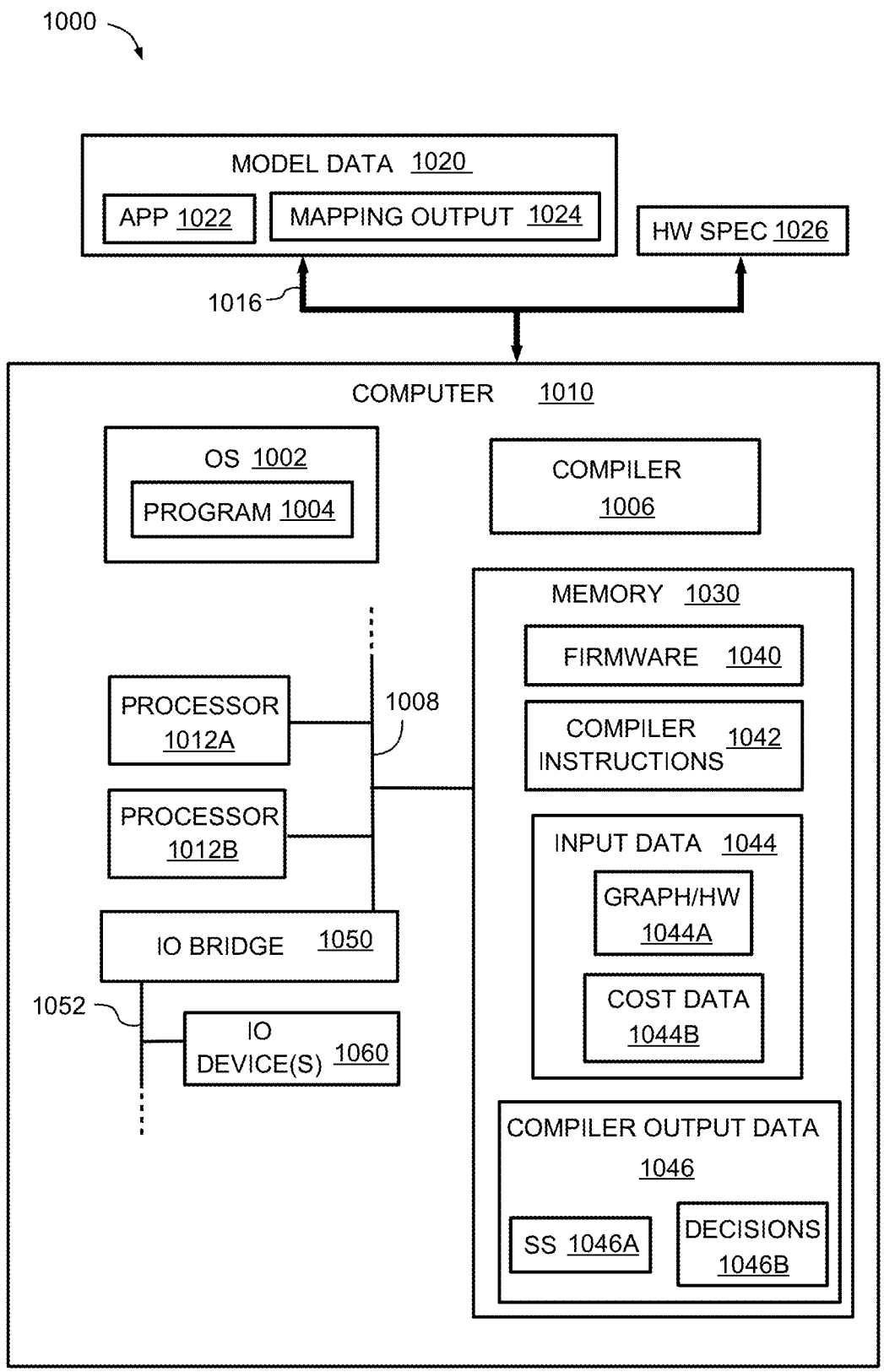
FIG. 10 illustrates an example system comprising a compiler, according to aspects of the disclosure.

FIG. 10 illustrates another example computing system for implementing features and aspects of the disclosure. In FIG. 10, computing system 1000 is shown comprising computer 1010, model data 1020, HW spec 1026, and interface 1016. Model data 1020 is shown including app 1022, which can comprise an application (e.g., source language statements and/or compiler directives of an application), and/or a representation of an application, such as an application graph and/or an application IR corresponding to an application. HW spec 1026 can comprise a description of hardware resources of a CGRS for executing an application of app 1022.

Computer 1010 is shown comprising compiler 1006, which can be a CGRS compiler such as in the examples of compiler 320 in FIG. 3 and compiler 908 of FIG. 9. In implementations compiler 1006 (e.g., a MAC of compiler 1006, not shown explicitly in FIG. 10) can input app 1022 from model data 1020 and/or HW spec 1026 and can determine mapping decisions of compiler 1006, such as mapping decisions and/or checkpoint solutions for checkpointing or recomputing tensors of app 1022. Compiler 1006 can output mapping decisions and/or checkpoint solutions to mapping output 1024 of model data 1020. Mapping output 1024 can comprise mapping decisions of compiler 1006, hardware (e.g., CGR hardware) allocations to operators/operands/results of an application represented by app 1022, and so forth. Interface 1016 can comprise an interconnect and/or programming interface (e.g., an API and/or a command line interface) to enable computer 1010 and/or compiler 1006 to access components of model data 1020, such as to input app 1022 and/or to output mapping output 1024.

Computer 1010 is shown further comprising OS 1002, program 1004, and firmware 1040. OS 1002 can comprise an operating system or operating system kernel and can host execution of programs such as program 1004. OS 1002, program 1004, and/or programs of firmware 1040 can comprise standalone programs, such as OS kernel programs, firmware, a hypervisor, or any variety of program utilized by a computer to manage execution of the computer. Compiler 1006 can comprise one or more programs and OS 1002 can, for example, host execution of programs of compiler 1006.

Hardware components of computer 1010 are shown comprising processors 1012A and 1012B (collectively, "processors 1012), memory 1030, interconnect fabric 1008, IO Bridge 1050, and IO Device(s) 1060 coupled to IO Bridge 1050 via IO interconnect 1022. Processors among processors 1012 can comprise any number, type, and/or combinations of hardware processors, cores of hardware processors, and/or execution threads of hardware processors. Computer 1010 can comprise a host computer of a CGRS and processors among processors 1012 can comprise components of a host processor and/or a runtime processor. Processors among processors 1012A and 1012B can execute programs of computer 1010, such as OS 1002, program 1004, program of firmware 1040, and/or programs of compiler 1006.

As illustrated in FIG. 10, interconnect fabric 1008 can comprise one or more hardware interconnections to interconnect processors 1012, memory 1030, and/or IO bridge 1050 in any combination. In implementations, interconnect fabric 1008 can comprise, for example, one or more memory buses, processor nests, and/or switching fabrics, in any combination or arrangement.

Processors 1012A and/or 1012B can communicate, via IO Bridge 1050, with IO device(s) 1060 which can comprise one or more IO devices. IO devices can comprise network interface cards, storage media and/or adapters, display adapters, keyboard/mouse adapters, and so forth among peripheral devices of a computer or computing system.

Memory 1030 can comprise one or more memories of, or accessible to, computer 1010, such as main memories, cache memories, flash memories, in any combination or arrangement. Memory 1030 can store, for example, instructions, input operands, and/or output results of programs executing in computer 1010. As shown in FIG. 10, memory 1030 can store compiler instructions 1042 for compiler 1006 to analyze an application graph and/or IR, generate a search space, such as a DBSS, and/or determine mapping decisions and/or checkpoint solutions.

Memory 1030 can store as input data to compiler 1006, shown in FIG. 10 as input data 1044. Graph/HW data 1044A, of input data 1044, can include data of a graph or IR of app 1022, and/or hardware data representing CGR hardware to execute an application of app 1022. Cost data 1044B, of input data 1044, can include recompute cost data that compiler 1006 can use to determine mapping decisions and/or checkpoint solutions. Cost data 1044B can comprise recompute costs, memory costs, and/or solution thresholds corresponding to, or for determining, solution costs for comparison to solution thresholds for determining checkpoint solutions of app 1022.

Memory 1030 can additionally, or alternatively, store compiler output data, such as data to include in a search space, mapping decisions, and/or checkpoint solutions. Compiler output data 1046 in shown in memory 1030 comprising search space SS 1046A, which can be a DBSS such as in the examples of the disclosure. Decisions 1046B can comprise mapping decisions and/or checkpoint solutions determined by compiler 1006.

Implementations can comprise a computer program product and can include a computer readable storage medium (or media) having computer readable program instructions of the computer program product incorporated therein. It will be understood by one of ordinary skill in the art that computer readable program instructions can implement each or any combination of operations and/or structure of the disclosure, such as illustrated by the drawings and described herein.

The computer readable program instructions can be provided to one or more processors, and/or other elements, of a computing system or apparatus to produce a machine which can execute, via the processor(s), to implement operations and/or actions similar or equivalent to those of the disclosure. The computer readable program instructions can be stored in a computer readable storage medium that can direct one or more processors, and/or other elements, of a computing system or apparatus to function in a particular manner, such that the computer readable storage medium comprises an article of manufacture including instructions to implement operations and/or structures similar or equivalent to those of the disclosure.

The computer readable program instructions of the computer program product can cause one or more processors to perform operations of the disclosure. A sequence of program instructions, and/or an assembly of one or more interrelated programming modules, of the computer program product can direct one or more one or more processors and/or computing elements of a computing system to implement the elements and/or operations of the disclosure including, but not limited to, the structures and operations illustrated and/or described in the present disclosure.

A computer readable storage medium can comprise any tangible (e.g., hardware) device, or combination of tangible devices, that can store instructions of the computer program product and that can be read by a computing element to download the instructions for use by a processor. A computer readable storage medium can comprise, but is not limited to, electronic, magnetic, optical, electromagnetic, and/or semiconductor storage devices, or any combination of these. A computer readable storage medium can comprise a portable storage medium, such as a magnetic disk/diskette, optical disk (CD or DVD); a volatile and/or non-volatile memory; a memory stick, a mechanically encoded device, and any combination of these. A computer readable storage medium, as used herein, is not to be construed as being transitory signals per se, such as electrical signals transmitted through a wire, radio waves or other freely propagating electromagnetic waves, or electromagnetic waves propagating through a wave transmission medium (e.g., a wave guide or fiber-optic cable).

The computer readable program instructions can be communicated from the computer readable storage medium to the one or more computing/processing devices, via a programming API of a computing system, and/or a communications interface of a computing system, having access to the computer readable storage medium, and/or a programming API of a computing system, and/or a communications interface of the one or more computing/processing devices. The API(s) and/or communications interface(s) can couple communicatively and/or operatively to a network, such as the Internet, a local area network, a wide area network, and/or a wireless network. The API(s) and/or communications interface(s) can receive the computer readable program instructions read from computer readable storage medium and can forward the computer readable program instructions to the one or more computing/processing devices via the API(s), communications interface(s), and/or network.

In implementations, the computer readable program instructions of the computer program product can comprise machine language and/or assembly language instructions, instruction-set-architecture (ISA) instructions, microcode and/or firmware instructions, state-setting data, configuration data for integrated circuitry, source code, and/or object code. The instructions and/or data can be written in any combination of one or more programming languages.

The computer readable program instructions can execute entirely, or in part, on a user's computer, as a stand-alone software package; partly on a user's computer and partly on a remote computer; or, entirely on a remote computer. A remote computer can be connected to a user's computer through any type of network, including a local area network (LAN) or a wide area network (WAN). In implementations, electronic circuitry including, for example, FPGA, PLAs, and or CGRPs can execute the computer readable program instructions by utilizing state information of the computer readable program instructions to configure the electronic circuitry to perform operations or elements of the disclosure, such as illustrated by the drawings and described herein.

In implementations, computer readable program instructions can also be loaded onto a computing system, or component(s) thereof, to cause the computing system and/or component(s) thereof to perform a series of operational steps to produce a computer implemented process, such that the instructions which execute on the computing system, or component(s) thereof, implement the operations or elements of the disclosure, such as illustrated by the drawings and described herein.

The flowchart and block diagrams in the Drawings and Incorporations illustrate the architecture, functionality, and operation of possible implementations of systems, methods, and computer program products according to various implementations of the present invention. Individual elements illustrated in the Figures—such as individual operations illustrated in the flowcharts or individual blocks of block diagrams—can represent a module, segment, or portion of executable instructions for implementing the disclosed function(s). In various alternative implementations, particular operations can occur in an order differing from that illustrated in the examples of the drawings. For example, two operations shown in succession in a diagram of the disclosure may, in a particular implementation, be executed substantially concurrently, or can sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

Terminology used herein, and the examples disclosed, are chosen to illustrate the principles of the implementations, the practical application or technical improvement over alternative technologies, and to enable others of ordinary skill in the art to understand the implementations disclosed herein. The disclosure illustrates various example implementations, and the examples are intended to illustrate principles and aspects of the disclosure, but are not intended to limit implementations, nor intended to be exhaustive of implementations that can be conceived within the scope of the disclosure. It will be appreciated by one of ordinary skill in the art that alternative implementations can comprise modifications and combinations within the spirit of the disclosure and the scope of the claims.

As can be seen in the foregoing examples, features of the disclosure can comprise methods and apparati of computing systems. A summary of example implementations of such features includes:

Example Implementation 1

A method comprises determining, by a compiler, a recompute node included in a dataflow application, the compiler executing on a computing system to perform the method; determining, by the compiler, a checkpoint tensor produced by the recompute node; determining, by the compiler, a recompute cost to recompute, during execution of the dataflow application by a second computing system, the checkpoint tensor; determining, by the compiler, a memory cost to checkpoint, during the execution of the dataflow application, the checkpoint tensor; determining, by the compiler, based on at least one of the recompute cost and the memory cost, a solution cost; comparing, by the compiler, the solution cost to a solution threshold; determining, by the compiler, based on the comparing the solution cost to the solution threshold, a checkpoint solution to execute, by the second computing system, the dataflow application; and, including, by the compiler, the checkpoint solution among mapping decisions associated with executing the dataflow application by the second computing system.

Example Implementation 2

The example of implementation 1, wherein the method of determining, by the compiler, the checkpoint solution based on the comparing the solution cost to the solution threshold comprises determining, by the compiler, based on the comparing the solution cost to the solution threshold, the checkpoint solution to comprise recomputing the checkpoint tensor during the execution of the dataflow application.

Example Implementation 3

The example of implementation 2, wherein recomputing the checkpoint tensor comprises overlapping, during the execution of the dataflow application, recomputing the checkpoint tensor with at least one of a forward computation of the dataflow application, a backward computation of the dataflow application, and a transfer of data of the dataflow application among memories of the second computing system.

Example Implementation 4

The example of implementation 1, wherein the method of determining, by the compiler, the checkpoint solution based on the comparing the solution cost to the solution threshold comprises determining, by the compiler, based on the comparing the solution cost to the solution threshold, the checkpoint solution to comprise checkpointing the checkpoint tensor during the execution of the dataflow application.

Example Implementation 5

The example of implementation 1, wherein the method of determining, by the compiler, the solution cost based on the at least one of the recompute cost and the memory cost comprises determining, by the compiler, the solution cost to comprise a recompute ratio computed as a ratio of the recompute cost to the memory cost; wherein the method of comparing, by the compiler, the solution cost to the solution threshold comprises comparing, by the compiler, the recompute ratio to the solution threshold; and, wherein the determining, by the compiler, the checkpoint solution based on the comparing the solution cost to the solution threshold comprises the compiler determining, based on the comparing the recompute ratio to the solution threshold, to comprise recomputing the checkpoint tensor during the execution of the dataflow application.

Example Implementation 6

The example of 1, wherein the method of determining, by the compiler, the solution cost based on the at least one of the recompute cost and the memory cost comprises determining, by the compiler, the solution cost to comprise a recompute ratio computed as a ratio of the recompute cost to the memory cost; wherein the method of comparing, by the compiler, the solution cost to the solution threshold comprises comparing, by the compiler, the recompute ratio to the solution threshold; and, wherein the determining, by the compiler, the checkpoint solution based on the comparing the solution cost to the solution threshold comprises the compiler determining, based on the comparing the recompute ratio to the solution threshold, to comprise checkpointing the checkpoint tensor during the execution of the dataflow application.

Example Implementation 7

The example of implementation 11, wherein the recompute cost is selected from a group consisting of: a total number of computational operations required to recompute the checkpoint tensor; utilization of a processor of the second computing system to recompute the checkpoint tensor; a total number of processor cycles, among a set of processors of the second computing system, to recompute the checkpoint tensor; and, delays among the set of processors of the second computing system to recompute the checkpoint tensor.

Example Implementation 8

The example of implementation 1, wherein the memory cost is selected from a group consisting of: a size of the checkpoint tensor; a size of a memory of the second computing system to store the checkpoint tensor; a latency to store the checkpoint tensor in the memory; a latency to access the checkpoint tensor in the memory; a bandwidth of a network of the second computing system to store the checkpoint tensor in the memory; and, a bandwidth of a second network of the second computing system to access the checkpoint tensor in the memory.

Example Implementation 9

A computer program product comprises a computer readable storage medium having program instructions embodied therewith, wherein the program instructions are executable by at least one processor of a first computing system to cause the at least one processor to:
determine a recompute node included in a dataflow application; determine a checkpoint tensor produced by the recompute node; determine a recompute cost recompute, during execution of the dataflow application by a second computing system, the checkpoint tensor; determine a memory cost to checkpoint, during the execution of the dataflow application, the checkpoint tensor; determine, based on at least one of the recompute cost and the memory cost, a solution cost; compare the solution cost to a solution threshold; determine, based on comparing the solution cost to the solution threshold, a checkpoint solution to execute, by the second computing system, the dataflow application; and, include the checkpoint solution among mapping decisions associated with executing the dataflow application by the second computing system.

Example Implementation 10

The example of implementation 9, wherein the program instructions are executable by the at least one processor to further cause the at least one processor to determine a recompute ratio comprising a ratio of the recompute cost to the memory cost; wherein the program instructions executable by the at least one processor to cause the at least one processor to determine the solution cost comprises the program instructions executable by the at least one processor to further cause the at least one processor to determine the solution cost to comprise the recompute ratio; wherein the program instructions executable by the at least one processor to cause the at least one processor to compare the solution cost to the solution threshold comprises the program instructions executable by the at least one processor to cause the at least one processor to compare the recompute ratio to the solution threshold; and, wherein the program instructions executable by the at least one processor to cause the at least one processor to determine the checkpoint solution based on comparing the solution cost to the solution threshold comprises the program instructions executable by the at least one processor to cause the at least one processor to determine, based on comparing the recompute ratio to the solution threshold, the checkpoint solution to comprise recomputing the checkpoint tensor during the execution of the dataflow application.

Example Implementation 11

The example of implementation 9, wherein the program instructions are executable by the at least one processor to further cause the at least one processor to determine a recompute ratio comprising a ratio of the recompute cost to the memory cost; wherein the program instructions executable by the at least one processor to cause the at least one processor to determine the solution cost based on the at least one of the recompute cost and the memory cost comprises the program instructions executable by the at least one processor to further cause the at least one processor to determine the solution cost to comprise the recompute ratio; wherein the program instructions executable by the at least one processor to cause the at least one processor to compare the solution cost to the solution threshold comprises the program instructions executable by the at least one processor to cause the at least one processor to compare the recompute ratio to the solution threshold; and, wherein the program instructions executable by the at least one processor to cause the at least one processor to determine the checkpoint solution based on comparing the solution cost to the solution threshold comprises the program instructions executable by the at least one processor to cause the at least one processor to determine, based on comparing the recompute ratio to the solution threshold, the checkpoint solution to comprise checkpointing the checkpoint tensor during the execution of the dataflow application.

Example Implementation 12

A computing system comprises a dataflow application, at least one processor, and a compiler, wherein the compiler is configured to execute, on the at least one processor, to:
determine a recompute node included in a dataflow application; determine a checkpoint tensor produced by the recompute node; determine a recompute cost to recompute, during execution of the dataflow application by an execution system, the checkpoint tensor; determine a memory cost to checkpoint, during the execution of the dataflow application, the checkpoint tensor; determine, based on at least one of the recompute cost and the memory cost, a solution cost; compare the solution cost to a solution threshold; and, determine, based on comparing the solution cost to the solution threshold, a checkpoint solution to execute the dataflow application.

Example Implementation 13

The example of implementation 12, wherein the compiler configured to determine the checkpoint solution based on comparing the solution cost to the solution threshold comprises the compiler further configured to determine, based on comparing the solution cost to the solution threshold, the checkpoint solution to comprise recomputing the checkpoint tensor during the execution of the dataflow application.

Example Implementation 14

The example of implementation 13, wherein recomputing the checkpoint tensor comprises overlapping, during the execution of the dataflow application, recomputing the checkpoint tensor with at least one of a forward computation of the dataflow application, a backward computation of the dataflow application, and a transfer of data of the dataflow application among memories of the execution system.

Example Implementation 15

The example of implementation 12, wherein the compiler configured to determine the checkpoint solution based on comparing the solution cost to the solution threshold comprises the compiler further configured to determine, based on comparing the solution cost to the solution threshold, the checkpoint solution to comprise checkpointing the checkpoint tensor during the execution of the dataflow application.

Example Implementation 16

The example of implementation 12, wherein the compiler configured to determine the solution cost based on the at least one of the recompute cost and the memory cost comprises the compiler further configured to determine the solution cost to comprise a recompute ratio as a ratio of the recompute cost to the memory cost; wherein the compiler configured to compare the solution cost to the solution threshold comprises the compiler further configured to compare the recompute ratio to the solution threshold; and, wherein the compiler configured to determine the checkpoint solution based on comparing the solution cost to the solution threshold comprises the compiler further configured to determine, based on comparing the recompute ratio to the solution threshold, the checkpoint solution to comprise recomputing the checkpoint tensor during the execution of the dataflow application.

Example Implementation 17

The example of implementation 12, wherein the compiler configured to determine the solution cost based on the at least one of the recompute cost and the memory cost comprises the compiler further configured to determine the solution cost to comprise a recompute ratio as a ratio of the recompute cost to the memory cost; wherein the compiler configured to compare the solution cost to the solution threshold comprises the compiler further configured to compare the recompute ratio to the solution threshold; and, wherein the compiler configured to determine the checkpoint solution based on comparing the solution cost to the solution threshold comprises the compiler further configured to determine, based on comparing the recompute ratio to the solution threshold, the checkpoint solution to comprise checkpointing the checkpoint tensor during the execution of the dataflow application.

Example Implementation 18

The example of implementation 12, wherein the recompute cost is selected from a group consisting of: a total number of computational operations required to recompute the checkpoint tensor; utilization of a processor of the execution system to recompute the checkpoint tensor; a total number of processor cycles, among a first set of processors of the execution system, to recompute the checkpoint tensor; and, delays among a second set of processors of the execution system to recompute the checkpoint tensor.

Example Implementation 19

The example of implementation 12, wherein the memory cost is selected from a group consisting of: a size of the checkpoint tensor; a size of a memory of the execution system to store the checkpoint tensor; a latency to store the checkpoint tensor in the memory; a latency to access the checkpoint tensor in the memory; a bandwidth of a network of the execution system to store the checkpoint tensor in the memory; and, a bandwidth of a second network of the execution system to access the checkpoint tensor in the memory.

Example Implementation 20

The example of implementation 12, wherein the compiler is further configured to include the checkpoint solution among mapping decisions for executing the dataflow application by the execution system.

What is claimed is:

1. A method comprising:
obtaining, by a compiler running on a computer system, a description of a dataflow application, the compiler executing on a computing system to perform the method;
translating, by the compiler, the description of the dataflow application into operations for execution on a coarse-grained reconfigurable system (CGRS), including a coarse-grained reconfigurable processor (CGRP);
determining, by the compiler, a recompute node included in the dataflow application;
determining, by the compiler, a checkpoint tensor produced by the recompute node;
determining, by the compiler, a recompute cost to recompute, during execution of the dataflow application by a second computing system, the checkpoint tensor;
determining, by the compiler, a memory cost to checkpoint, during the execution of the dataflow application, the checkpoint tensor;
determining, by the compiler, based on at least one of the recompute cost and the memory cost, a solution cost;
comparing, by the compiler, the solution cost to a solution threshold;
determining, by the compiler, based on the comparing the solution cost to the solution threshold, a checkpoint solution to execute, by the second computing system, the dataflow application; and,
including, by the compiler, the checkpoint solution among mapping decisions associated with executing the dataflow application by the second computing system;
generating, by the compiler, a configuration file for the CGRP based on the mapping decisions, including the checkpoint solution;
wherein the configuration file, when loaded into the CGRP, performs at least a portion of the dataflow application.

2. The method of claim 1, wherein the method of determining, by the compiler, the checkpoint solution based on the comparing the solution cost to the solution threshold comprises determining, by the compiler, based on the comparing the solution cost to the solution threshold, the checkpoint solution to comprise recomputing the checkpoint tensor during the execution of the dataflow application.

3. The method of claim 2, wherein recomputing the checkpoint tensor comprises overlapping, during the execution of the dataflow application, recomputing the checkpoint tensor with at least one of a forward computation of the dataflow application, a backward computation of the dataflow application, and a transfer of data of the dataflow application among memories of the second computing system.

4. The method of claim 1, wherein the method of determining, by the compiler, the checkpoint solution based on the comparing the solution cost to the solution threshold comprises determining, by the compiler, based on the comparing the solution cost to the solution threshold, the checkpoint solution to comprise checkpointing the checkpoint tensor during the execution of the dataflow application.

5. The method of claim 1, wherein the method of determining, by the compiler, the solution cost based on the at least one of the recompute cost and the memory cost comprises determining, by the compiler, the solution cost to comprise a recompute ratio computed as a ratio of the recompute cost to the memory cost;
wherein the method of comparing, by the compiler, the solution cost to the solution threshold comprises comparing, by the compiler, the recompute ratio to the solution threshold; and,
wherein the determining, by the compiler, the checkpoint solution based on the comparing the solution cost to the solution threshold comprises the compiler determining, based on the comparing the recompute ratio to the solution threshold, to comprise recomputing the checkpoint tensor during the execution of the dataflow application.

6. The method of claim 1, wherein the method of determining, by the compiler, the solution cost based on the at least one of the recompute cost and the memory cost comprises determining, by the compiler, the solution cost to comprise a recompute ratio computed as a ratio of the recompute cost to the memory cost;
wherein the method of comparing, by the compiler, the solution cost to the solution threshold comprises comparing, by the compiler, the recompute ratio to the solution threshold; and,
wherein the determining, by the compiler, the checkpoint solution based on the comparing the solution cost to the solution threshold comprises the compiler determining, based on the comparing the recompute ratio to the solution threshold, to comprise checkpointing the checkpoint tensor during the execution of the dataflow application.

7. The method of claim 1, wherein the recompute cost is selected from a group consisting of: a total number of computational operations required to recompute the checkpoint tensor; utilization of a processor of the second computing system to recompute the checkpoint tensor; a total number of processor cycles, among a set of processors of the second computing system, to recompute the checkpoint tensor; and, delays among the set of processors of the second computing system to recompute the checkpoint tensor.

8. The method of claim 1, wherein the memory cost is selected from a group consisting of: a size of the checkpoint tensor; a size of a memory of the second computing system to store the checkpoint tensor; a latency to store the checkpoint tensor in the memory; a latency to access the checkpoint tensor in the memory; a bandwidth of a network of the second computing system to store the checkpoint tensor in the memory; and, a bandwidth of a second network of the second computing system to access the checkpoint tensor in the memory.

9. A computer program product, the computer program product comprising a computer readable storage medium having program instructions embodied therewith, wherein the program instructions are executable by at least one processor of a first computing system to cause the at least one processor to:

obtain a description of a dataflow application;
translate the description of the dataflow application into operations for execution on a coarse-grained reconfigurable system (CGRS), including a coarse-grained reconfigurable processor (CGRP);
determine a recompute node included in the dataflow application;
determine a checkpoint tensor produced by the recompute node;
determine a recompute cost to recompute, during execution of the dataflow application by a second computing system, the checkpoint tensor;
determine a memory cost to checkpoint, during the execution of the dataflow application, the checkpoint tensor;
determine, based on at least one of the recompute cost and the memory cost, a solution cost;
compare the solution cost to a solution threshold;
determine, based on comparing the solution cost to the solution threshold, a checkpoint solution to execute, by the second computing system, the dataflow application;
include the checkpoint solution among mapping decisions associated with executing the dataflow application by the second computing system; and
generate a configuration file for the CGRP based on the mapping decisions, including the checkpoint solution;
wherein the configuration file, when loaded into the CGRP, performs at least a portion of the dataflow application.

10. The computer program product of claim 9, wherein the program instructions are executable by the at least one processor to further cause the at least one processor to determine a recompute ratio comprising a ratio of the recompute cost to the memory cost;
wherein the program instructions executable by the at least one processor to cause the at least one processor to determine the solution cost comprises the program instructions executable by the at least one processor to further cause the at least one processor to determine the solution cost to comprise the recompute ratio;
wherein the program instructions executable by the at least one processor to cause the at least one processor to compare the solution cost to the solution threshold comprises the program instructions executable by the at least one processor to cause the at least one processor to compare the recompute ratio to the solution threshold; and,
wherein the program instructions executable by the at least one processor to cause the at least one processor to determine the checkpoint solution based on comparing the solution cost to the solution threshold comprises the program instructions executable by the at least one processor to cause the at least one processor to determine, based on comparing the recompute ratio to the solution threshold, the checkpoint solution to comprise recomputing the checkpoint tensor during the execution of the dataflow application.

11. The computer program product of claim 9, wherein the program instructions are executable by the at least one processor to further cause the at least one processor to determine a recompute ratio comprising a ratio of the recompute cost to the memory cost;
wherein the program instructions executable by the at least one processor to cause the at least one processor to determine the solution cost based on the at least one of the recompute cost and the memory cost comprises the program instructions executable by the at least one processor to further cause the at least one processor to determine the solution cost to comprise the recompute ratio;
wherein the program instructions executable by the at least one processor to cause the at least one processor to compare the solution cost to the solution threshold comprises the program instructions executable by the at least one processor to cause the at least one processor to compare the recompute ratio to the solution threshold; and,
wherein the program instructions executable by the at least one processor to cause the at least one processor to determine the checkpoint solution based on comparing the solution cost to the solution threshold comprises the program instructions executable by the at least one processor to cause the at least one processor to determine, based on comparing the recompute ratio to the solution threshold, the checkpoint solution to comprise checkpointing the checkpoint tensor during the execution of the dataflow application.

12. A computing system comprising:
at least one processor, and
a compiler, wherein the compiler is configured to execute, on the at least one processor, to:
obtain a description of a dataflow application;
translate the description of the dataflow application into operations for execution on a coarse-grained reconfigurable system (CGRS), including a coarse-grained reconfigurable processor (CGRP);
determine a recompute node included in the dataflow application;
determine a checkpoint tensor produced by the recompute node;
determine a recompute cost to recompute, during execution of the dataflow application by a second computing system, the checkpoint tensor;
determine a memory cost to checkpoint, during the execution of the dataflow application, the checkpoint tensor;
determine, based on at least one of the recompute cost and the memory cost, a solution cost;
compare the solution cost to a solution threshold;
determine, based on comparing the solution cost to the solution threshold, a checkpoint solution to execute, the dataflow application;
generate a configuration file for the CGRP based on the mapping decisions, including the checkpoint solution;
wherein the configuration file, when loaded into the CGRP, performs at least a portion of the dataflow application.

13. The computing system of claim 12, wherein the compiler configured to determine the checkpoint solution based on comparing the solution cost to the solution threshold comprises the compiler further configured to determine, based on comparing the solution cost to the solution threshold, the checkpoint solution to comprise recomputing the checkpoint tensor during the execution of the dataflow application.

14. The computing system of claim 13, wherein recomputing the checkpoint tensor comprises overlapping, during the execution of the dataflow application, recomputing the checkpoint tensor with at least one of a forward computation of the dataflow application, a backward computation of the dataflow application, and a transfer of data of the dataflow application among memories of the execution system.

15. The computing system of claim 12, wherein the compiler configured to determine the checkpoint solution based on comparing the solution cost to the solution threshold comprises the compiler further configured to determine, based on comparing the solution cost to the solution threshold, the checkpoint solution to comprise checkpointing the checkpoint tensor during the execution of the dataflow application.

16. The computing system of claim 12, wherein the compiler configured to determine the solution cost based on the at least one of the recompute cost and the memory cost comprises the compiler further configured to determine the solution cost to comprise a recompute ratio as a ratio of the recompute cost to the memory cost;
   wherein the compiler configured to compare the solution cost to the solution threshold comprises the compiler further configured to compare the recompute ratio to the solution threshold; and,
   wherein the compiler configured to determine the checkpoint solution based on comparing the solution cost to the solution threshold comprises the compiler further configured to determine, based on comparing the recompute ratio to the solution threshold, the checkpoint solution to comprise recomputing the checkpoint tensor during the execution of the dataflow application.

17. The computing system of claim 12, wherein the compiler configured to determine the solution cost based on the at least one of the recompute cost and the memory cost comprises the compiler further configured to determine the solution cost to comprise a recompute ratio as a ratio of the recompute cost to the memory cost;
   wherein the compiler configured to compare the solution cost to the solution threshold comprises the compiler further configured to compare the recompute ratio to the solution threshold; and,
   wherein the compiler configured to determine the checkpoint solution based on comparing the solution cost to the solution threshold comprises the compiler further configured to determine, based on comparing the recompute ratio to the solution threshold, the checkpoint solution to comprise checkpointing the checkpoint tensor during the execution of the dataflow application.

18. The computing system of claim 12, wherein the recompute cost is selected from a group consisting of: a total number of computational operations required to recompute the checkpoint tensor; utilization of a processor of the execution system to recompute the checkpoint tensor; a total number of processor cycles, among a first set of processors of the execution system, to recompute the checkpoint tensor; and, delays among a second set of processors of the execution system to recompute the checkpoint tensor.

19. The computing system of claim 12, wherein the memory cost is selected from a group consisting of: a size of the checkpoint tensor; a size of a memory of the execution system to store the checkpoint tensor; a latency to store the checkpoint tensor in the memory; a latency to access the checkpoint tensor in the memory; a bandwidth of a network of the execution system to store the checkpoint tensor in the memory; and, a bandwidth of a second network of the execution system to access the checkpoint tensor in the memory.

20. The computing system of claim 12, wherein the compiler is further configured to include the checkpoint solution among mapping decisions for executing the dataflow application by the execution system.

* * * * *